Figure 1:
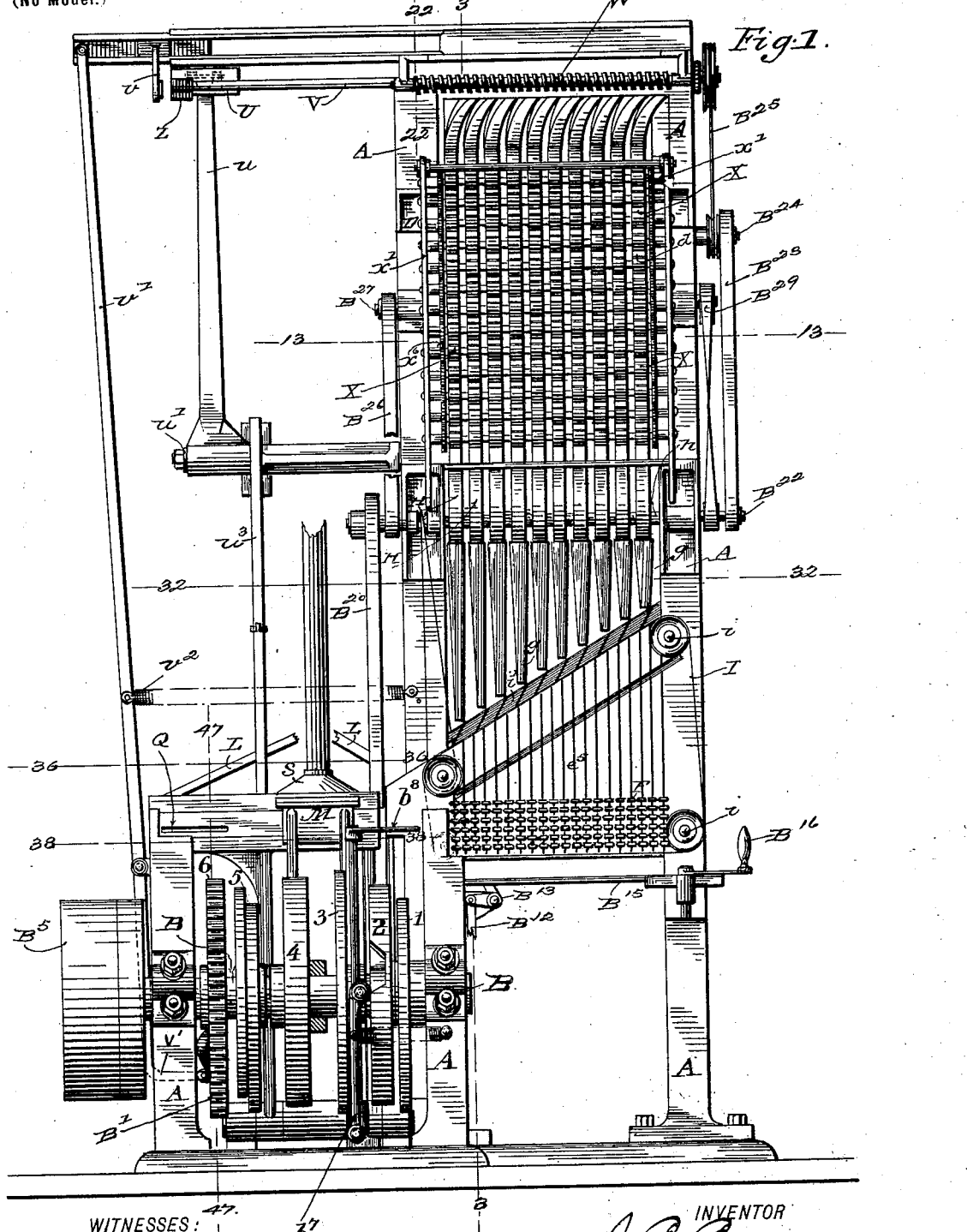

No. 678,036. Patented July 9, 1901.
J. R. ROGERS.
LINOTYPE MACHINE.
(Application filed July 31, 1900.)
(No Model.) 28 Sheets—Sheet 6.
Fig. 6.
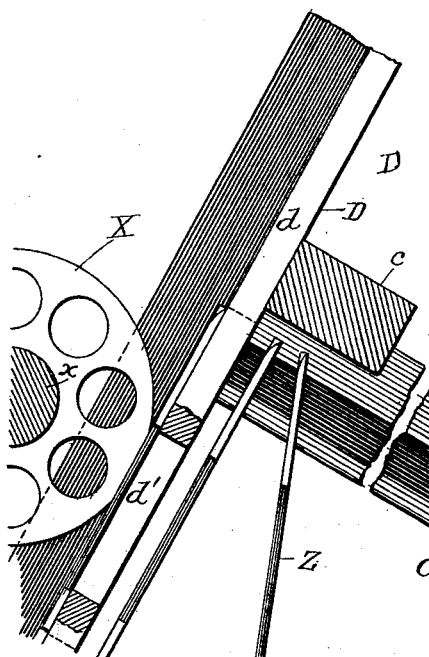
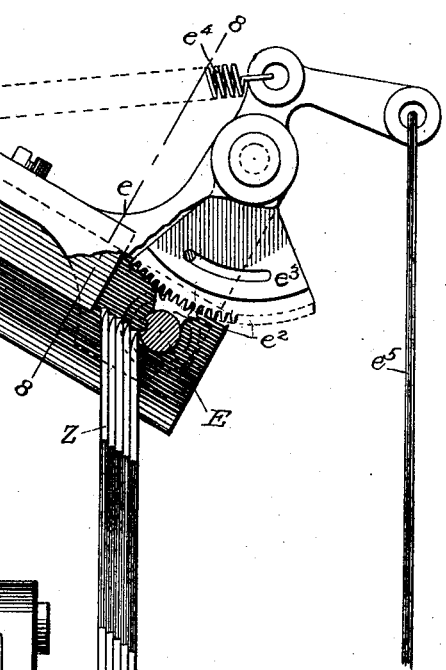
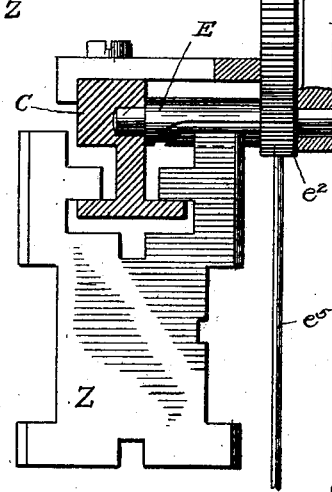
Fig. 7.
Fig. 8.
WITNESSES:
INVENTOR
John R Rogers
BY
Philip T Dodge
ATTORNEY.

No. 678,036. Patented July 9, 1901.
J. R. ROGERS.
LINOTYPE MACHINE.
(Application filed July 31, 1900.)
(No Model.) 28 Sheets—Sheet 7.

WITNESSES:
F. S. Elmore
A. M. E. Kennedy

INVENTOR
John R. Rogers
BY
Philip T. Dodge
ATTORNEY.

THE NORRIS PETERS CO., PHOTO-LITHO., WASHINGTON, D. C.

No. 678,036. Patented July 9, 1901.
J. R. ROGERS.
LINOTYPE MACHINE.
(Application filed July 31, 1900.)
(No Model.) 28 Sheets—Sheet 8.
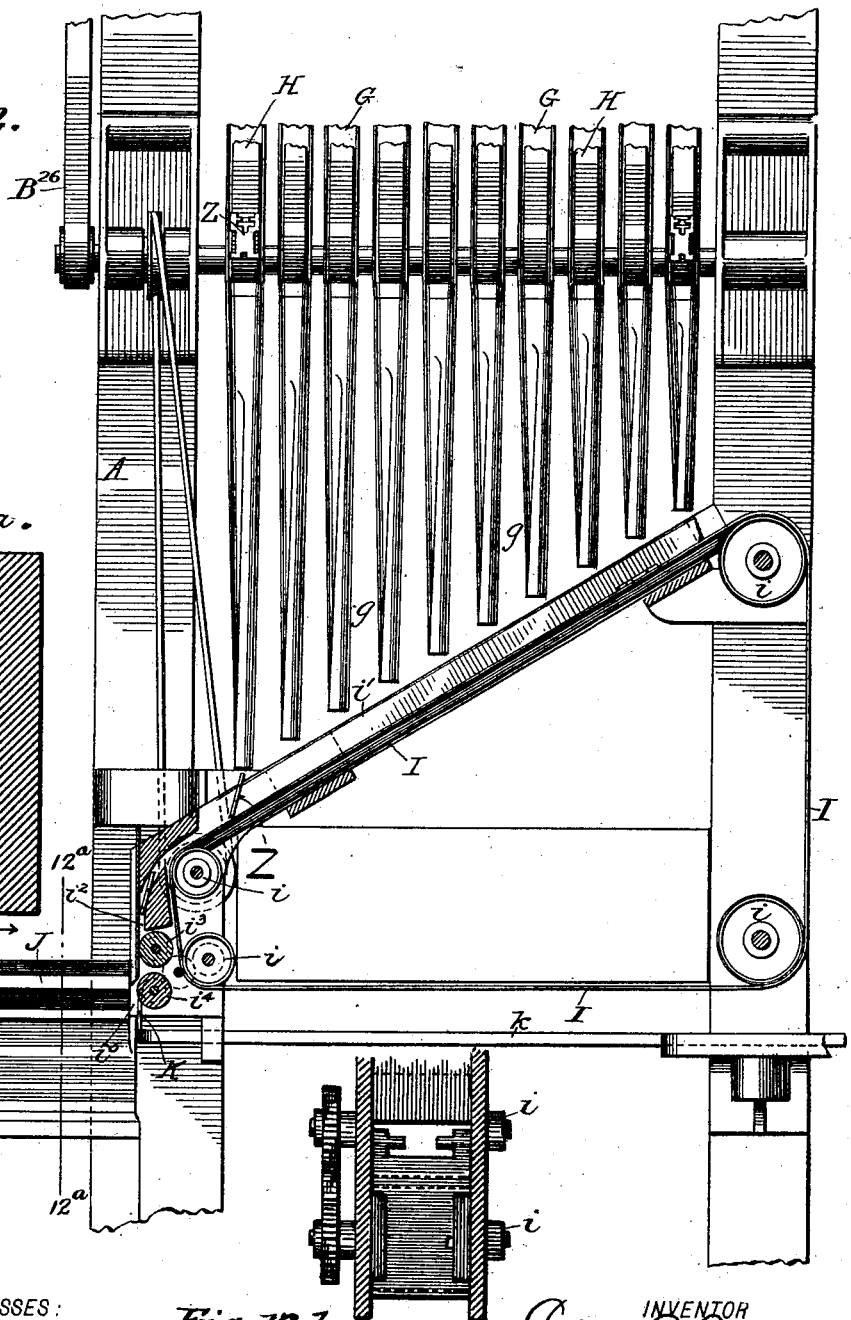
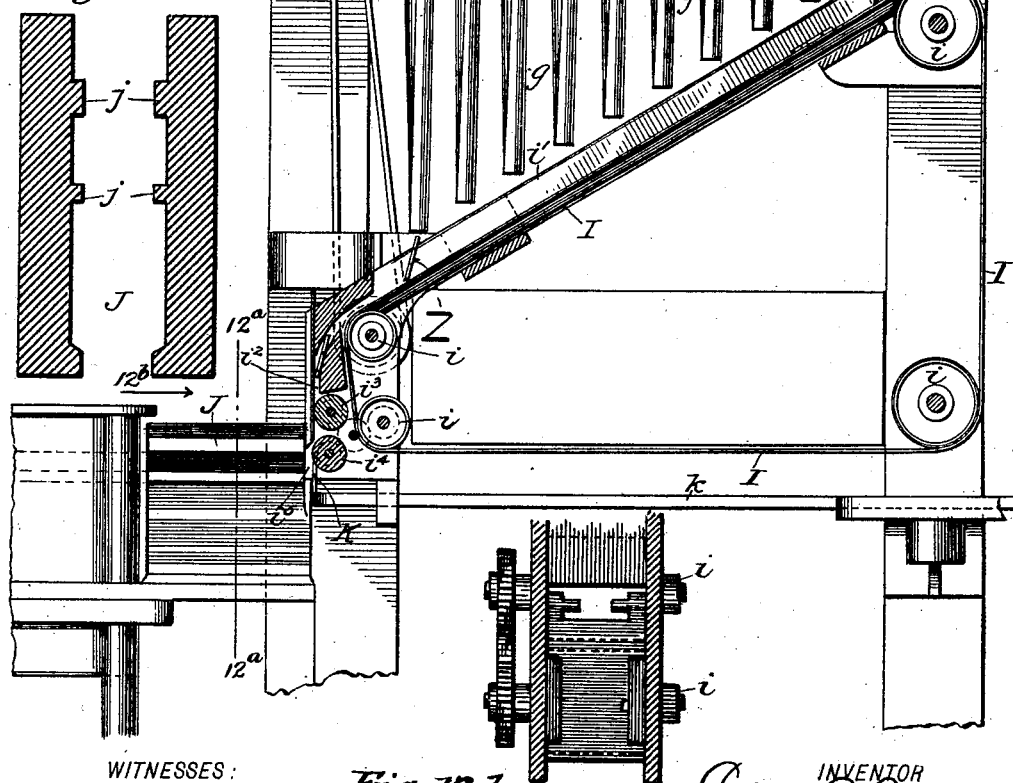

No. 678,036. Patented July 9, 1901.
J. R. ROGERS.
LINOTYPE MACHINE.
(Application filed July 31, 1900.)
(No Model.) 28 Sheets—Sheet 9.
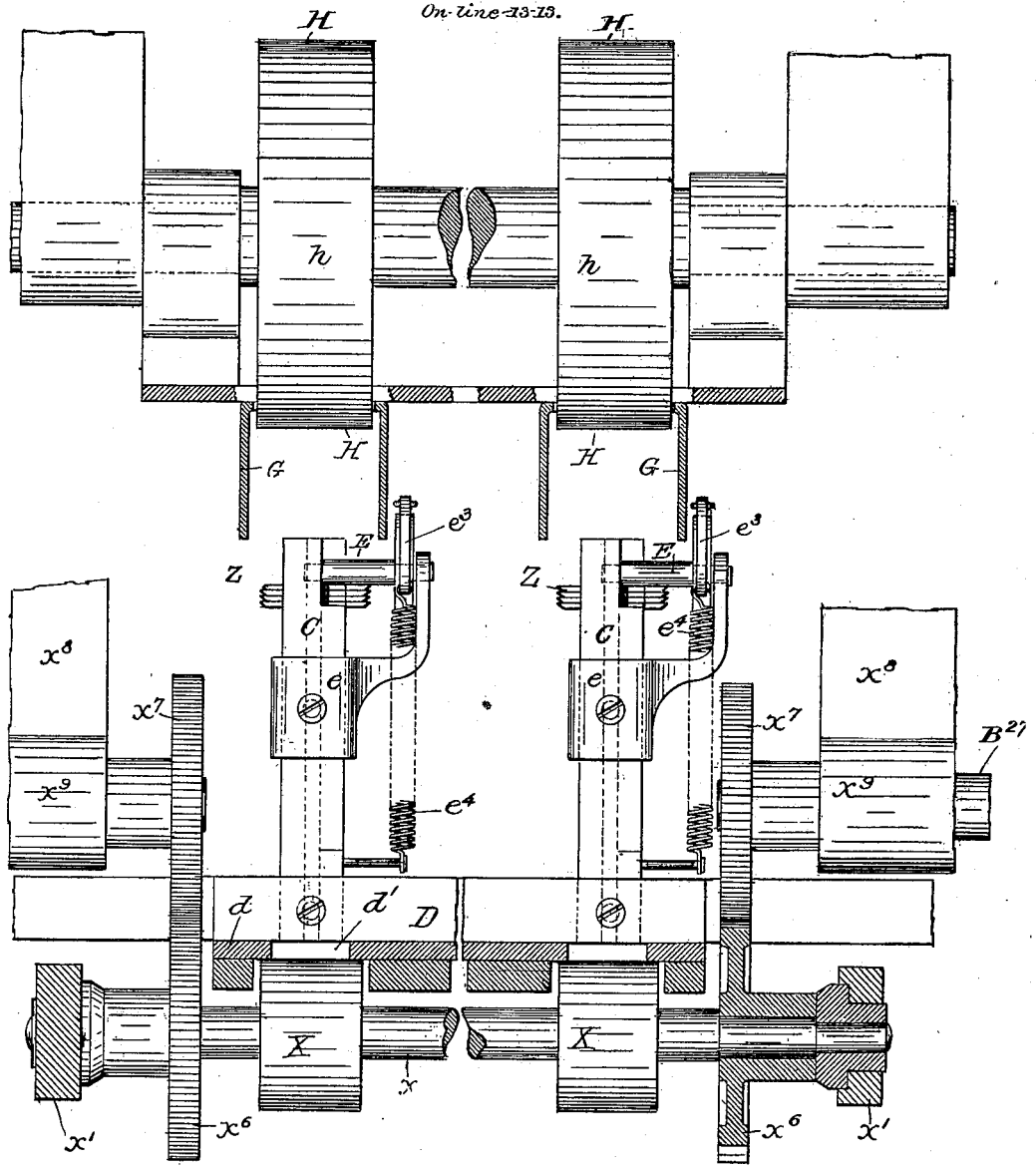

No. 678,036. Patented July 9, 1901.
J. R. ROGERS.
LINOTYPE MACHINE.
(Application filed July 31, 1900.)
(No Model.) 28 Sheets—Sheet 11.
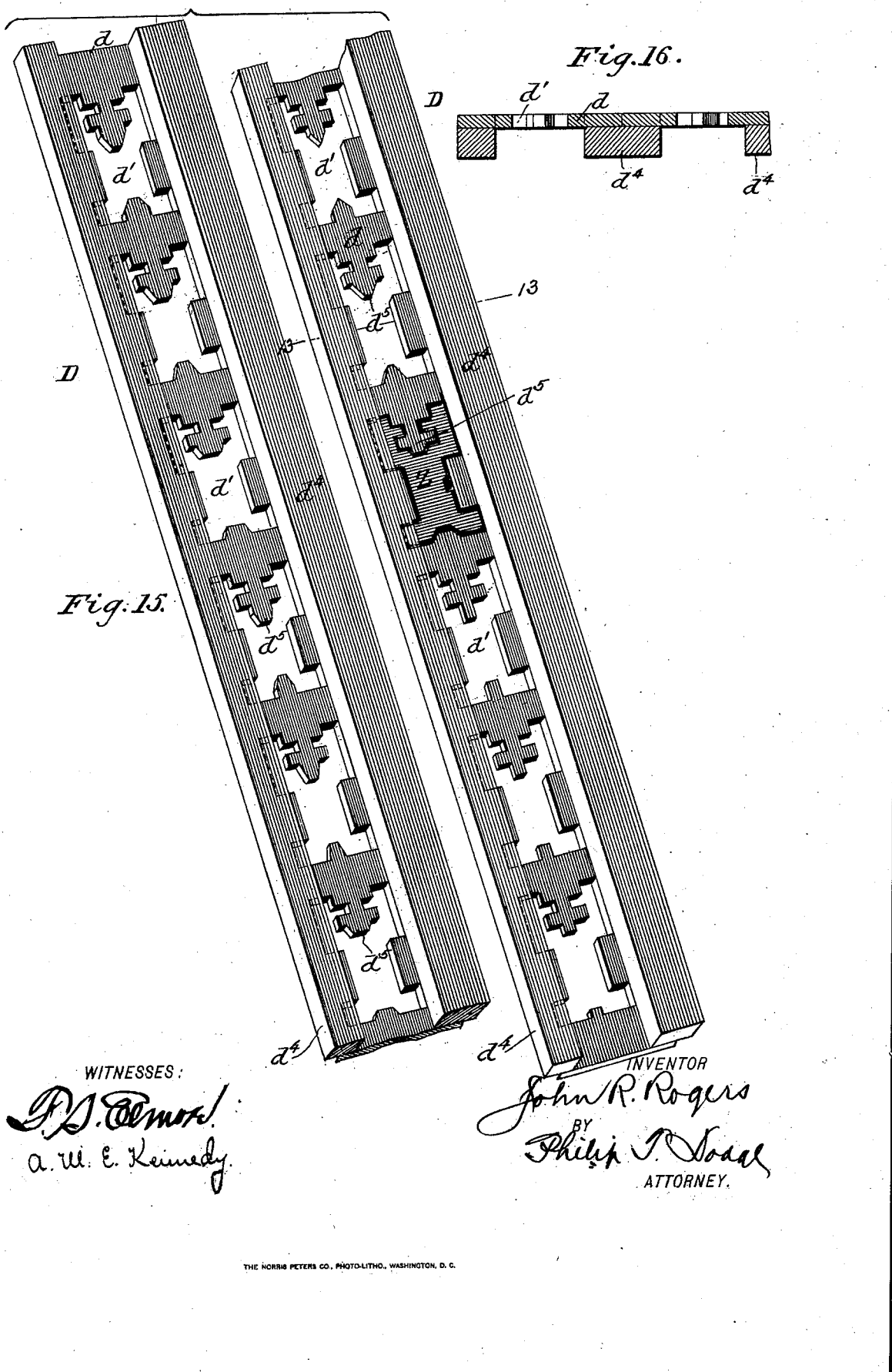

No. 678,036. Patented July 9, 1901.
J. R. ROGERS.
LINOTYPE MACHINE.
(Application filed July 31, 1900.)
(No Model.) 28 Sheets—Sheet 12.
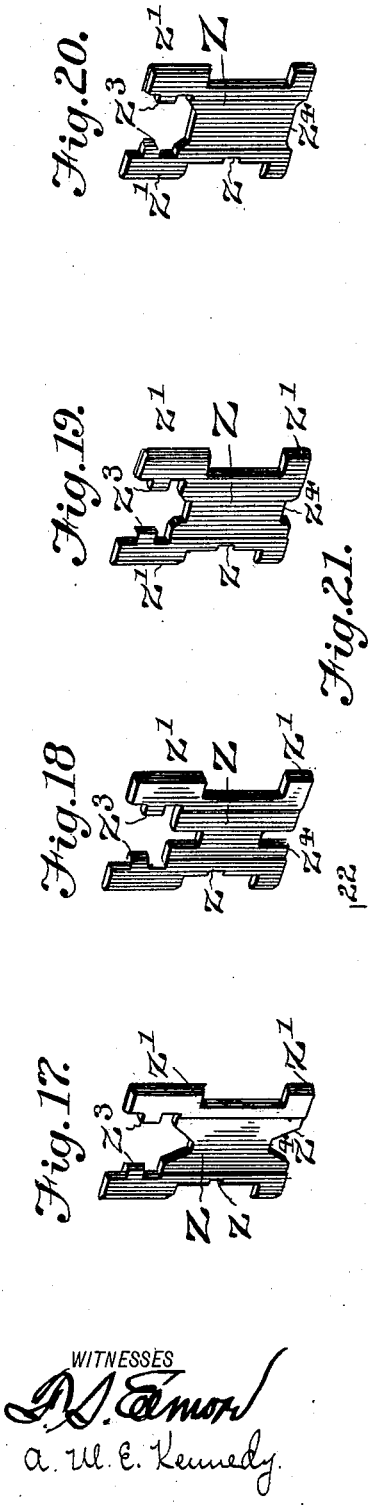
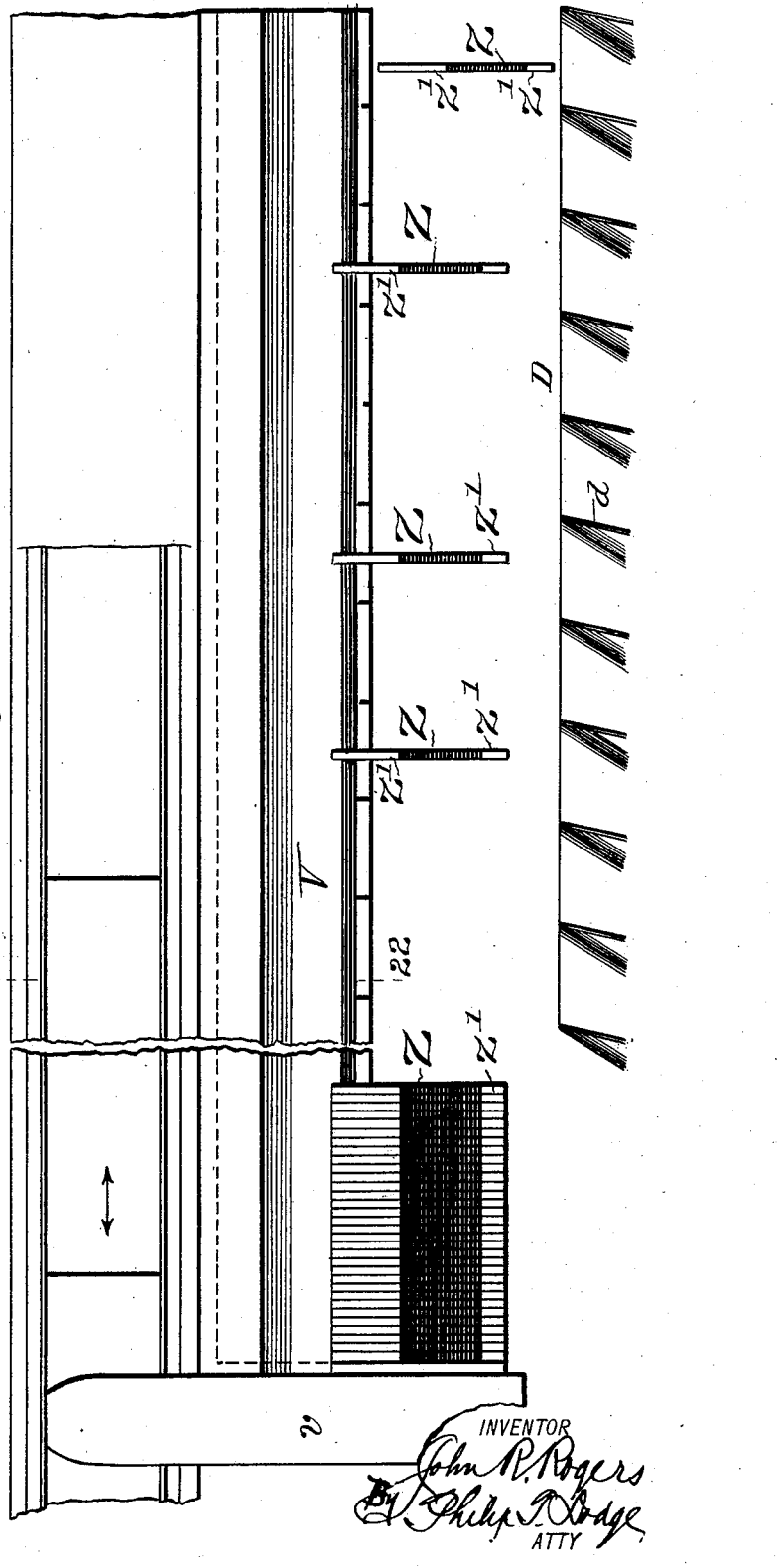
WITNESSES
INVENTOR
ATTY No. 678,036. Patented July 9, 1901.
J. R. ROGERS.
LINOTYPE MACHINE.
(Application filed July 31, 1900.)
(No Model.) 28 Sheets—Sheet 13.
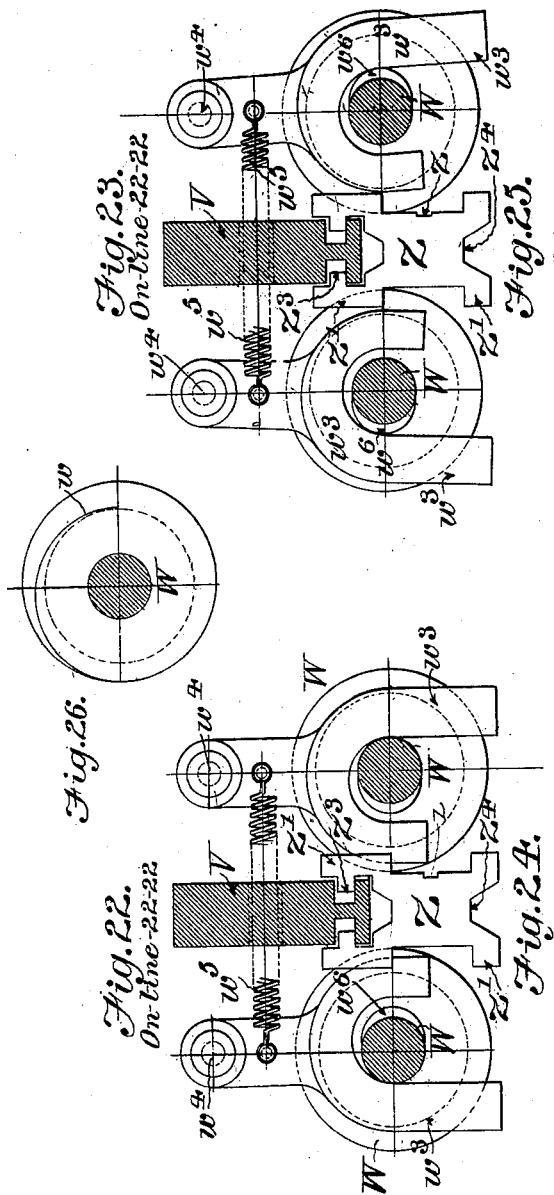
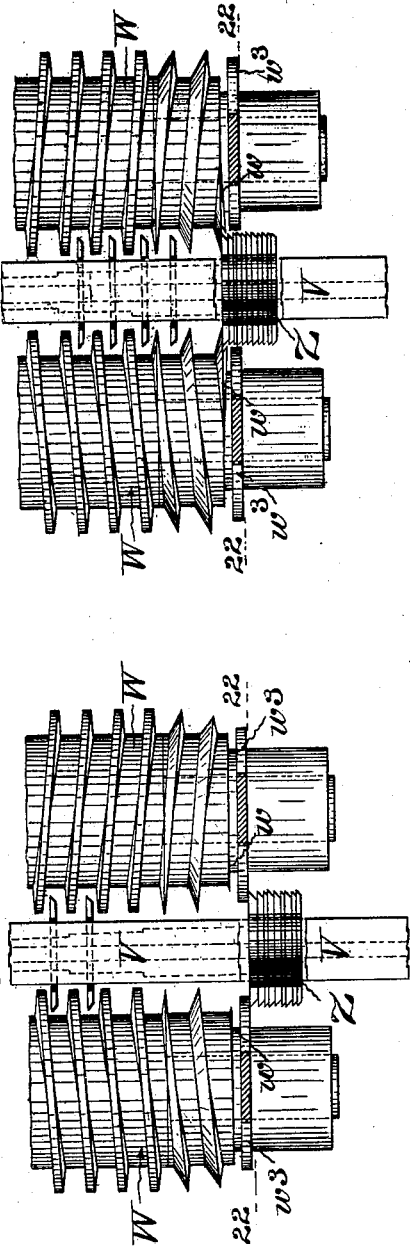
WITNESSES:
F. A. Elmore
A. M. E. Kennedy
INVENTOR
John R. Rogers
BY Philip T. Dodge
ATTORNEY.

No. 678,036. Patented July 9, 1901.
J. R. ROGERS.
LINOTYPE MACHINE.
(Application filed July 31, 1900.)
(No Model.) 28 Sheets—Sheet 14.

No. 678,036. Patented July 9, 1901.
J. R. ROGERS.
LINOTYPE MACHINE.
(Application filed July 31, 1900.)
(No Model.) 28 Sheets—Sheet 15.

On line 30-30

WITNESSES:
F. S. Elmore
A. M. E. Kennedy

INVENTOR
John R. Rogers
BY
Philip T. Dodge
ATTORNEY.

No. 678,036. Patented July 9, 1901.
J. R. ROGERS.
LINOTYPE MACHINE.
(Application filed July 31, 1900.)
(No Model.) 28 Sheets—Sheet 18.

WITNESSES: INVENTOR
J. R. Rogers
BY
P. T. Dodge
ATTORNEY

No. 678,036. Patented July 9, 1901.
J. R. ROGERS.
LINOTYPE MACHINE.
(Application filed July 31, 1900.)
(No Model.) 28 Sheets—Sheet 20.

No. 678,036.  
J. R. ROGERS.  
LINOTYPE MACHINE.  
(Application filed July 31, 1900.)

Patented July 9, 1901.

(No Model.)

28 Sheets—Sheet 22.

on line 39-39.

No. 678,036. Patented July 9, 1901.
J. R. ROGERS.
LINOTYPE MACHINE.
(Application filed July 31, 1900.)
(No Model.) 28 Sheets—Sheet 23.
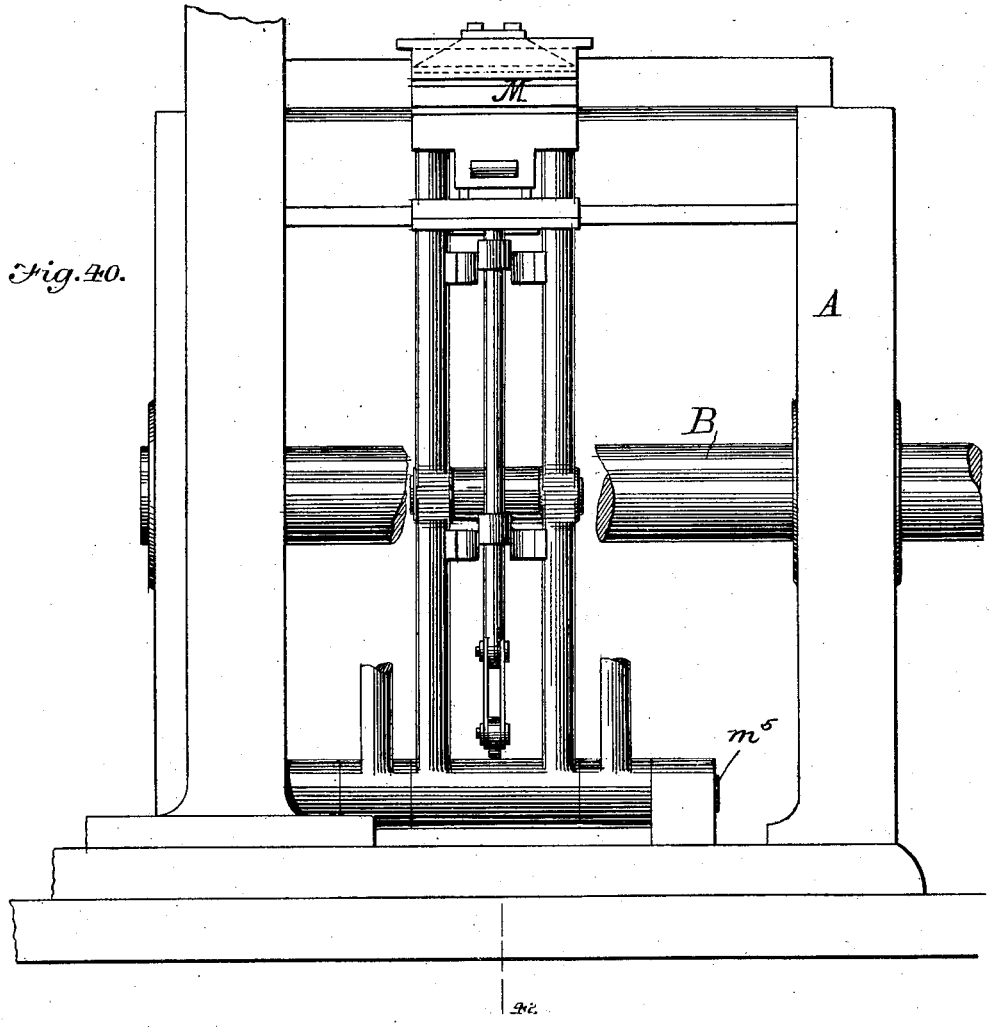

No. 678,036. Patented July 9, 1901.
J. R. ROGERS.
LINOTYPE MACHINE.
(Application filed July 31, 1900.)
(No Model.) 28 Sheets—Sheet 24.
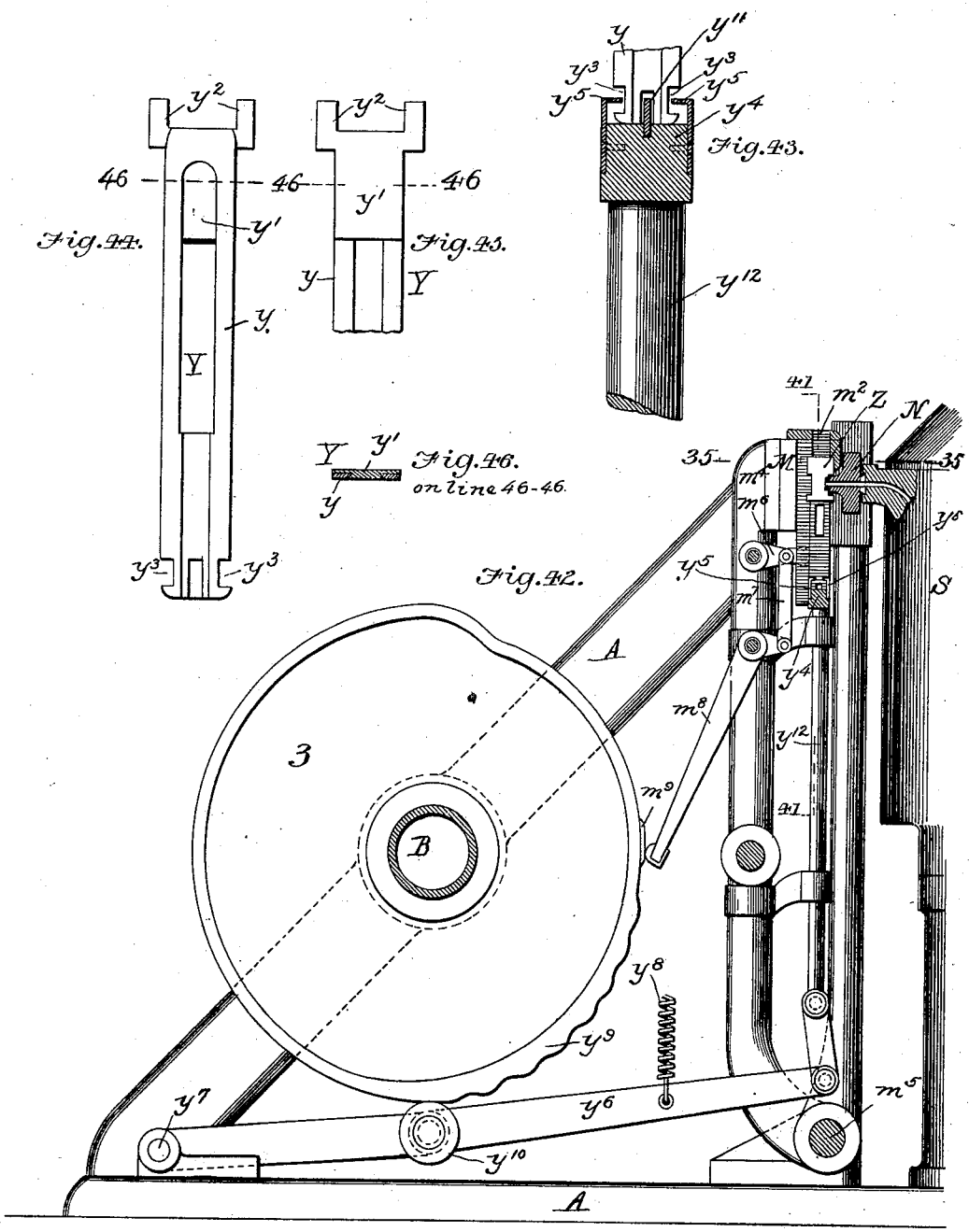
WITNESSES:
INVENTOR
John R. Rogers
BY
Philip T. Dodge
ATTORNEY.

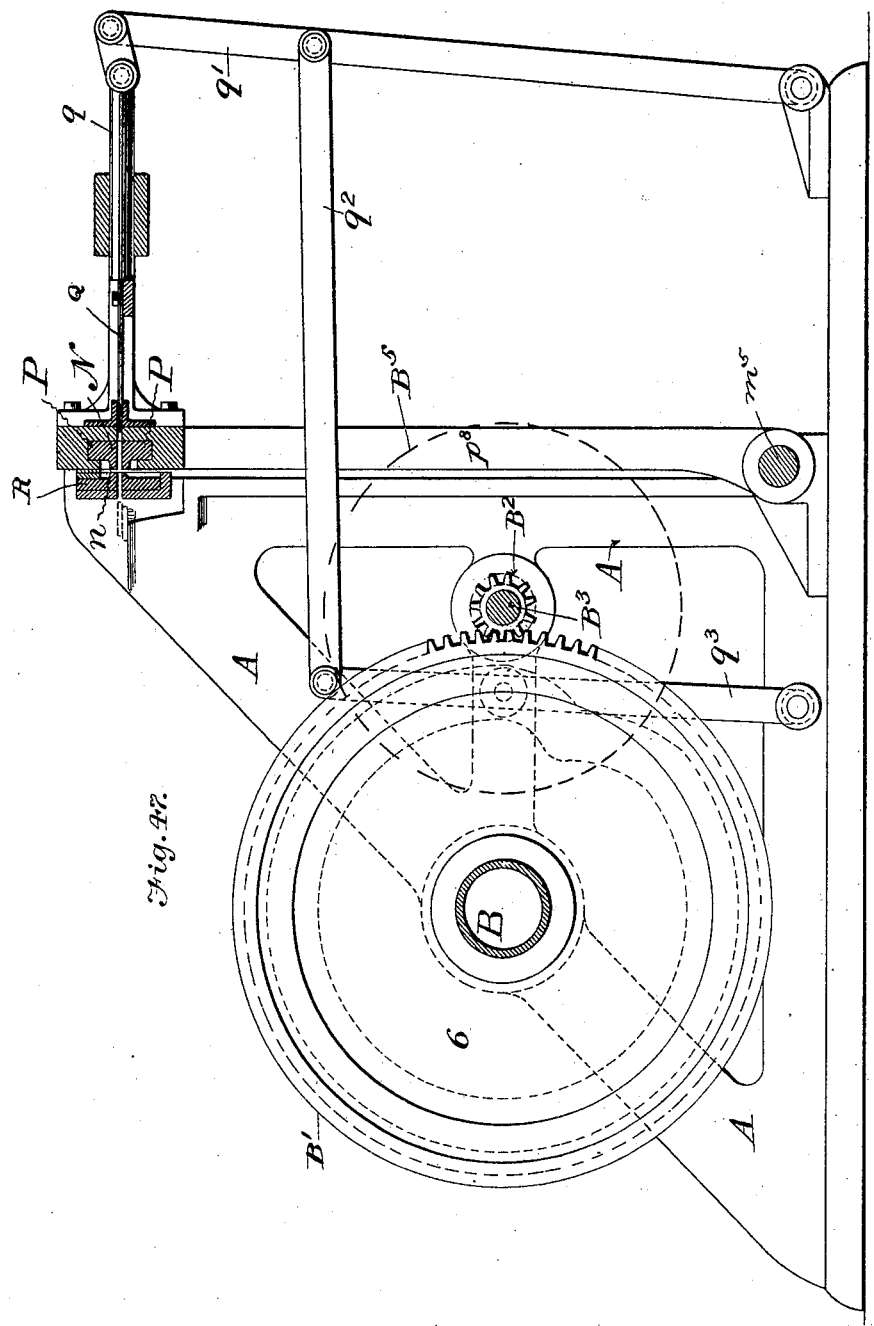

No. 678,036. Patented July 9, 1901.
J. R. ROGERS.
LINOTYPE MACHINE.
(Application filed July 31, 1900.)
(No Model.) 28 Sheets—Sheet 26.

WITNESSES
INVENTOR
John R. Rogers
ATTY

No. 678,036. Patented July 9, 1901.
J. R. ROGERS.
LINOTYPE MACHINE.
(Application filed July 31, 1900.)
(No Model.) 28 Sheets—Sheet 27.
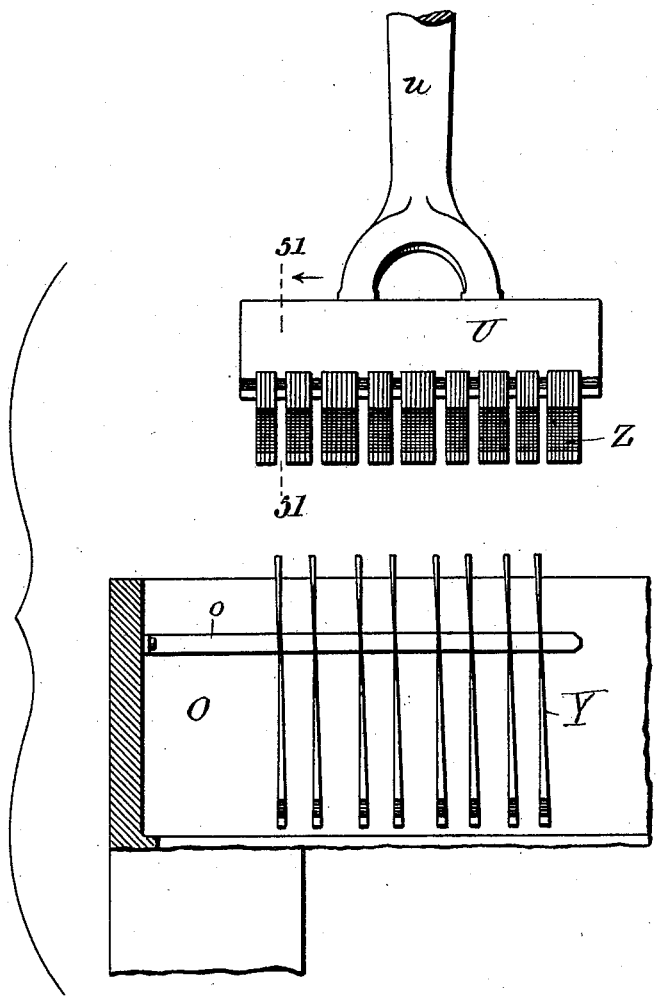
Fig. 50.
Fig. 51.
On line 31-31
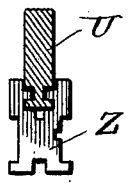
WITNESSES
INVENTOR No. 678,036. Patented July 9, 1901.
J. R. ROGERS.
LINOTYPE MACHINE.
(Application filed July 31, 1900.)
(No Model.) 28 Sheets—Sheet 28.

WITNESSES:
F. S. Elmore
H. R. Kenney

INVENTOR
J. R. Rogers
BY P. T. Dodge
ATTORNEY

THE NORRIS PETERS CO., PHOTO-LITHO., WASHINGTON, D. C.

UNITED STATES PATENT OFFICE.

JOHN R. ROGERS, OF BROOKLYN, NEW YORK, ASSIGNOR TO THE MERGENTHALER LINOTYPE COMPANY, OF NEW YORK.

LINOTYPE-MACHINE.

SPECIFICATION forming part of Letters Patent No. 678,036, dated July 9, 1901.

Application filed July 31, 1900. Serial No. 25,403. (No model.)

*To all whom it may concern:*

Be it known that I, JOHN R. ROGERS, of Brooklyn, county of Kings, and State of New York, have invented a new and useful Improvement in Linotype-Machines, of which the following is a specification.

This invention has reference to linotype-machines in which metal matrices containing independent letters or other characters are selected and temporarily assembled in line, together with suitable spacers, in the order in which their characters are to appear in print, the line thus composed transferred to the front of a slotted mold, the mold then filled with molten metal or other material to produce a printing-slug or linotype, on the edge of which the type characters are formed by the matrices, and finally the composed line of matrices distributed and returned to the magazine from which they were delivered.

The object of my invention is to produce a machine of this class which shall be exceedingly simple in construction, which shall be composed largely of parts constructed in duplicate, so that they may be cheaply made, and so that the machines may be conveniently built of larger or smaller size, as demanded.

Figure 2:
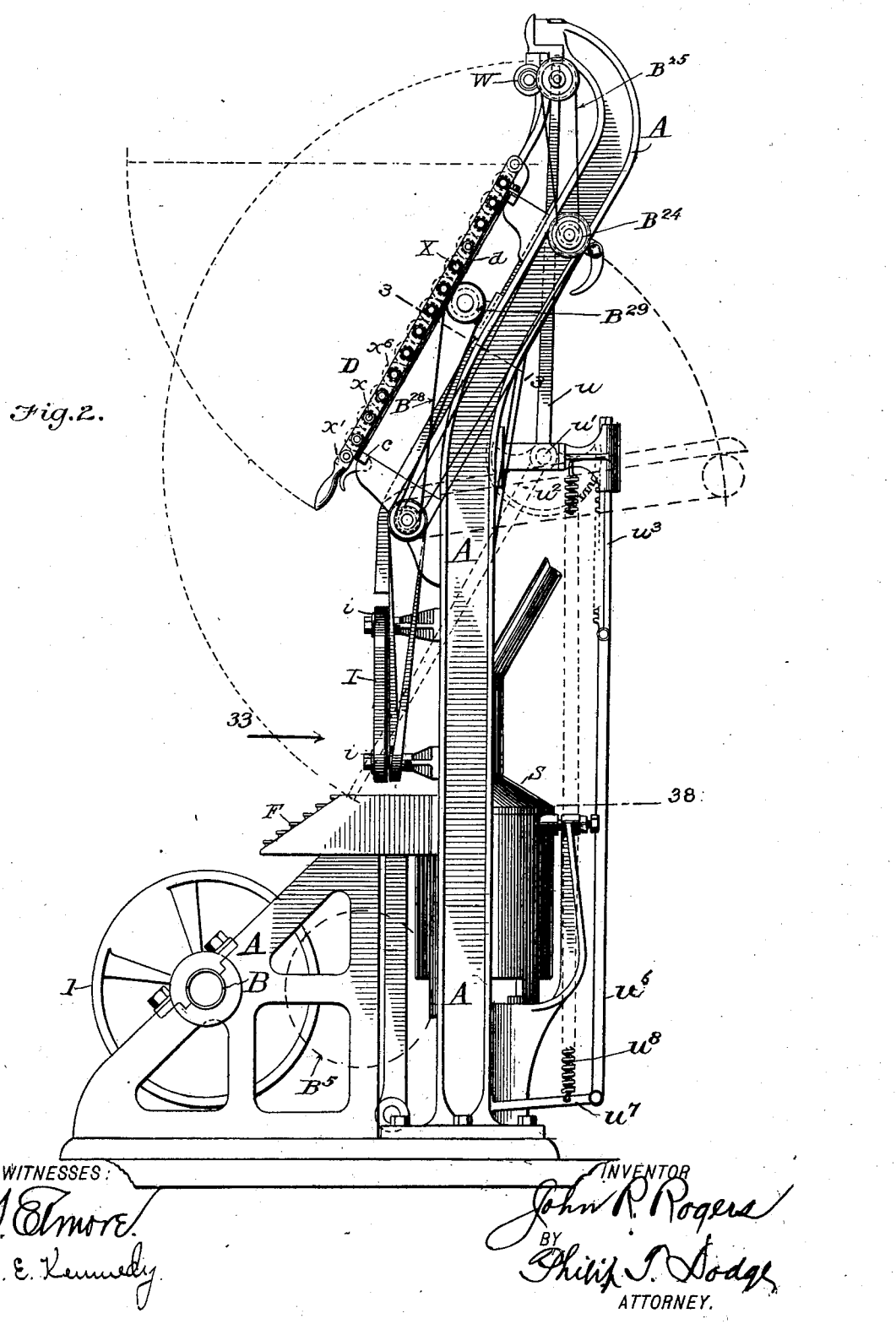
Figure 3:
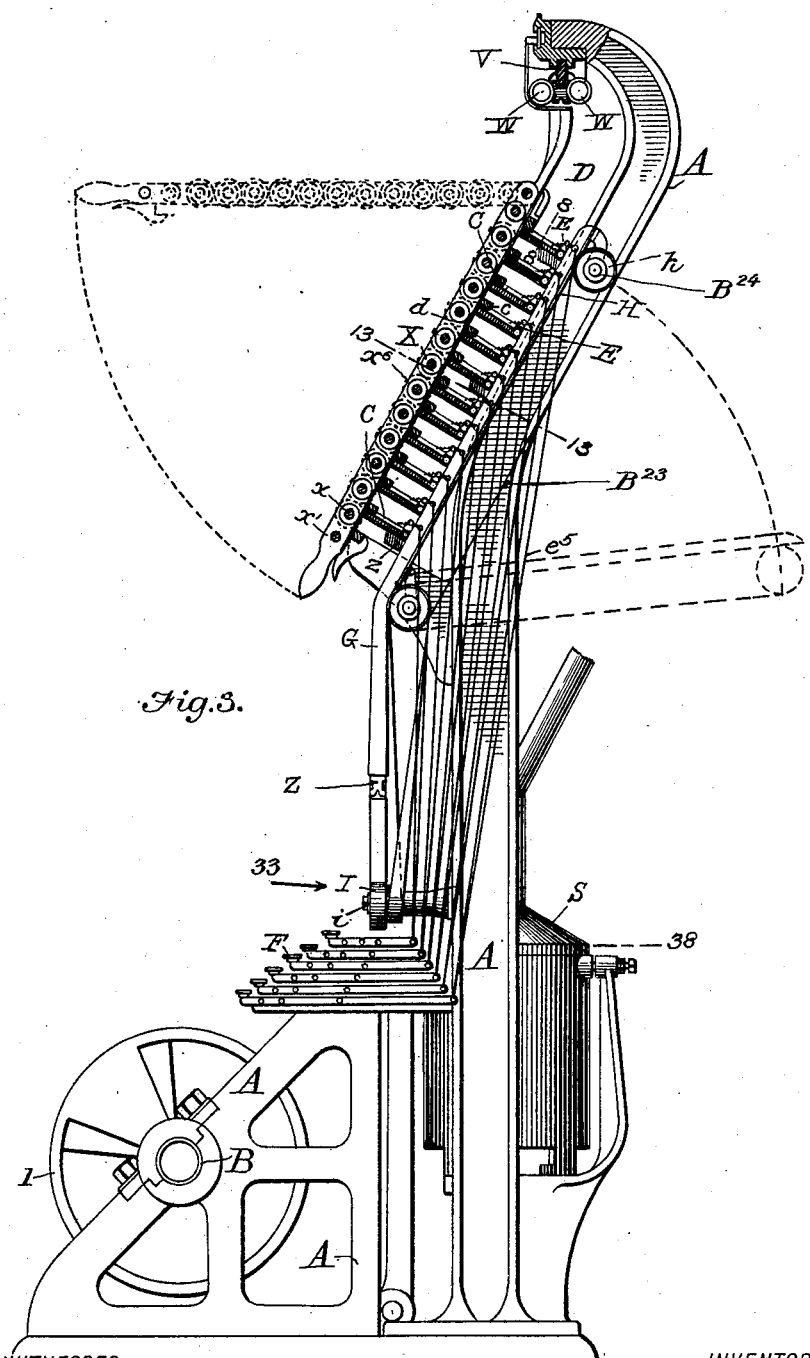
Figure 4:
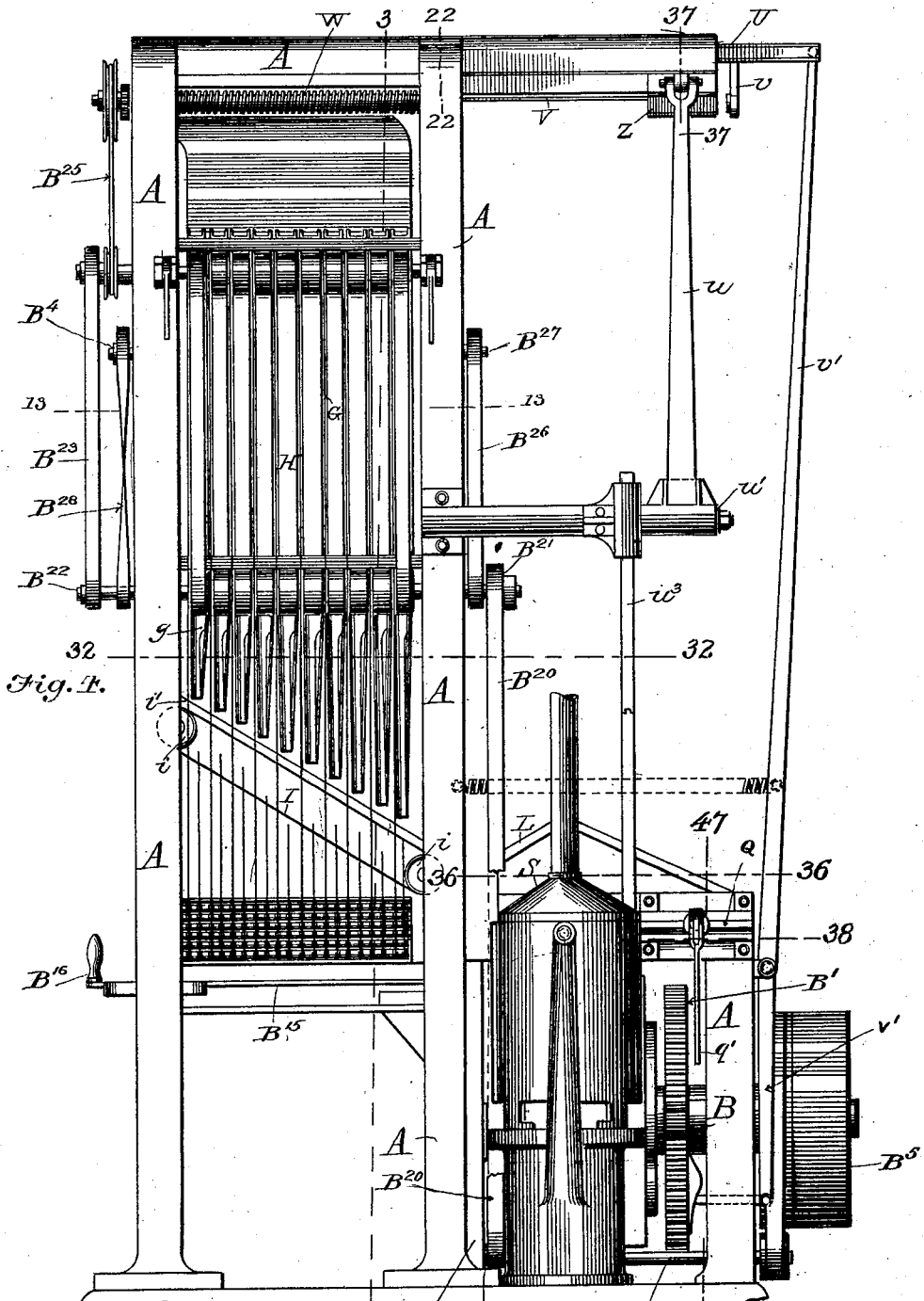
Figure 5:
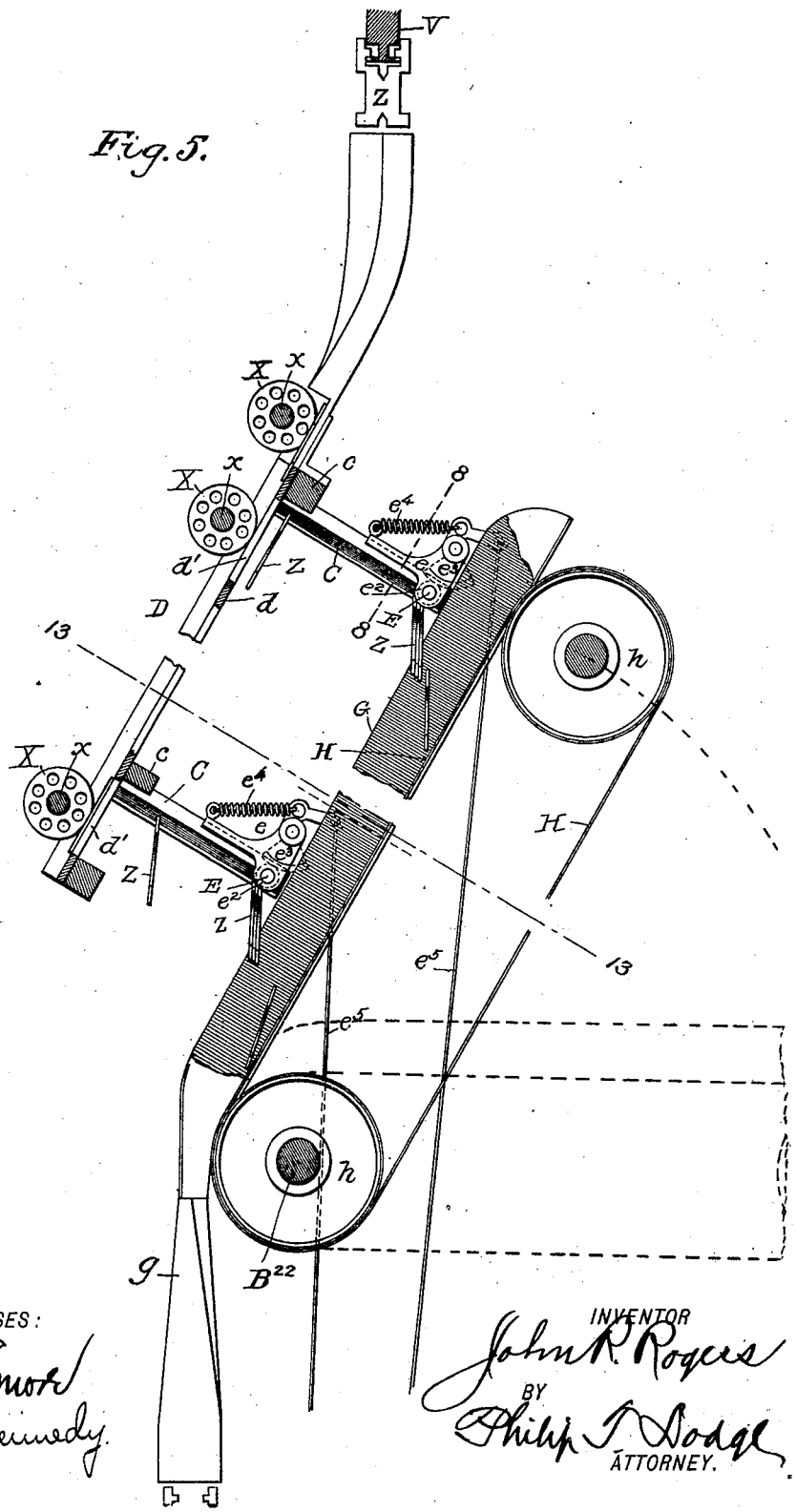
Figure 9:
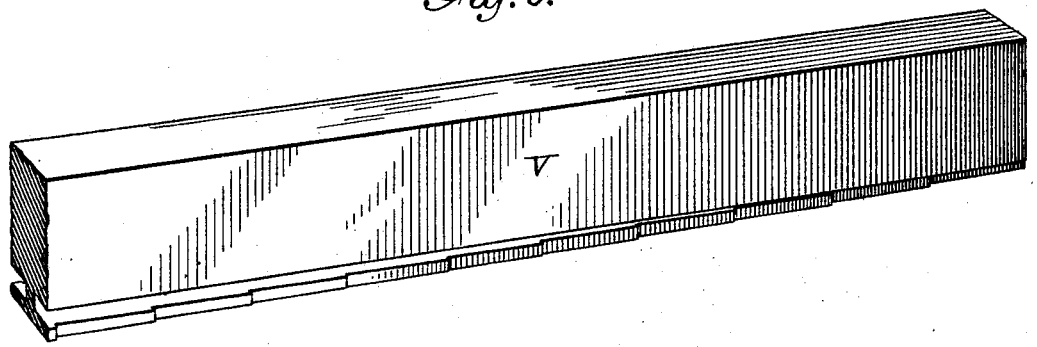
Figure 10:
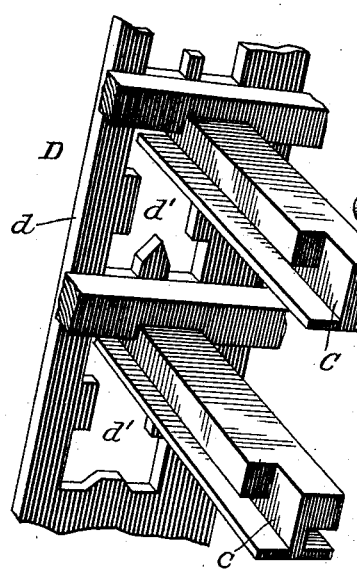
Figure 11:
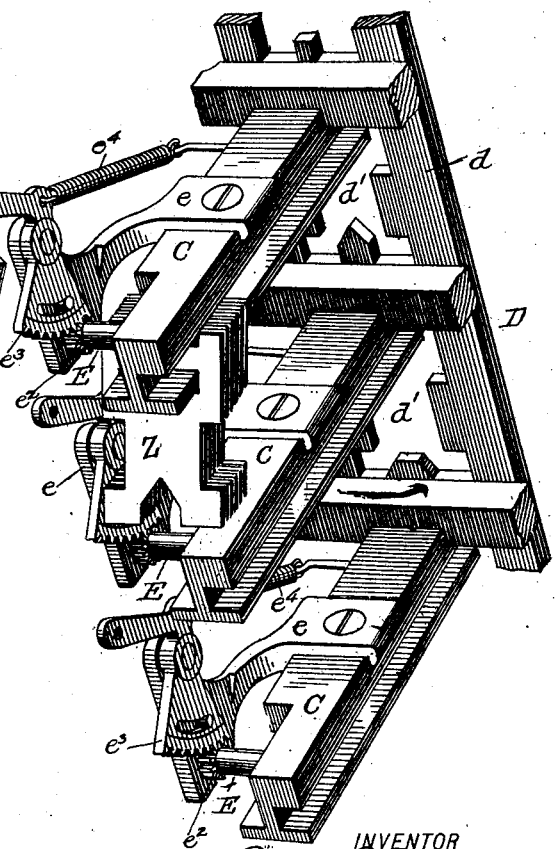
Figure 14:
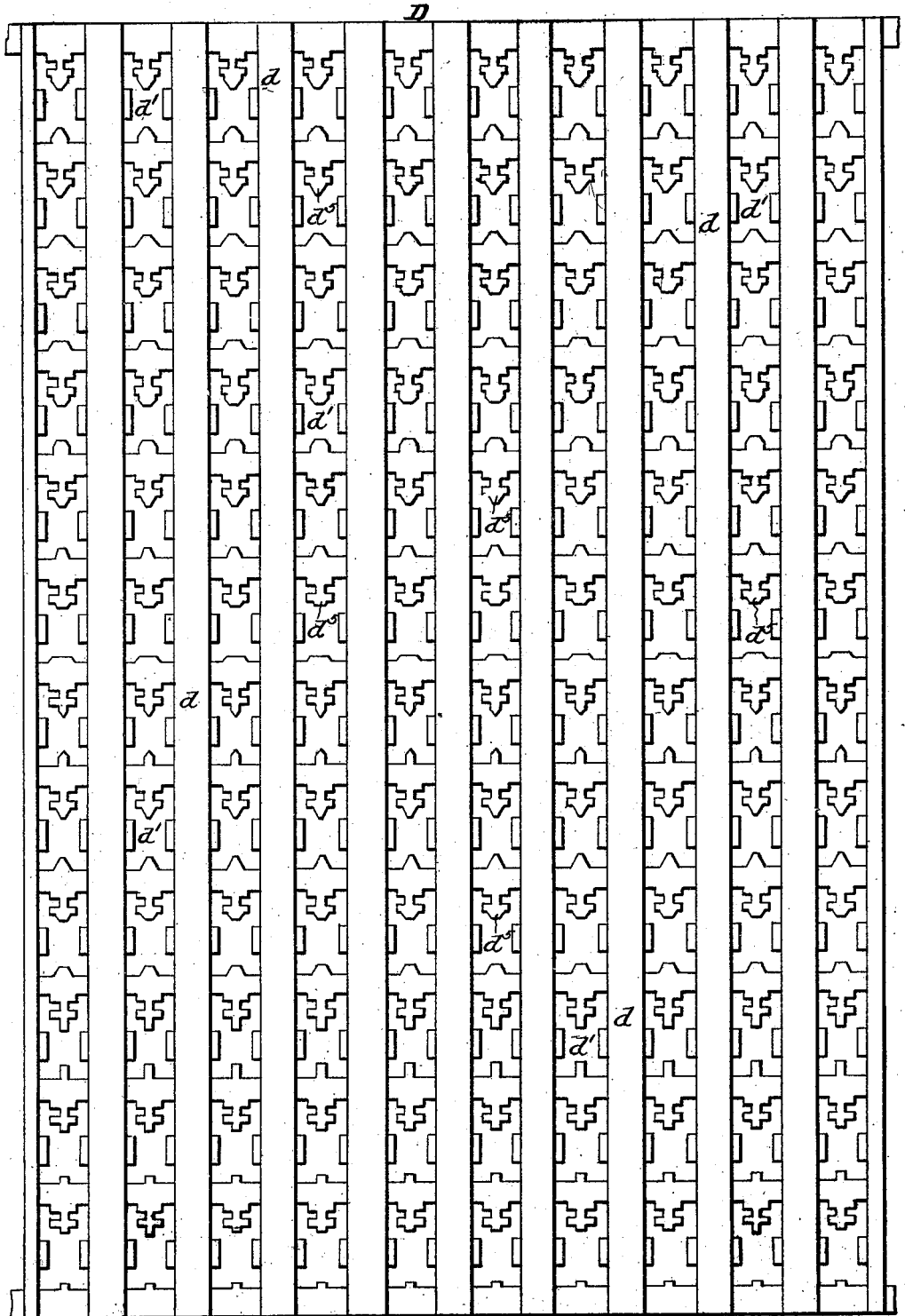
Figure 27:
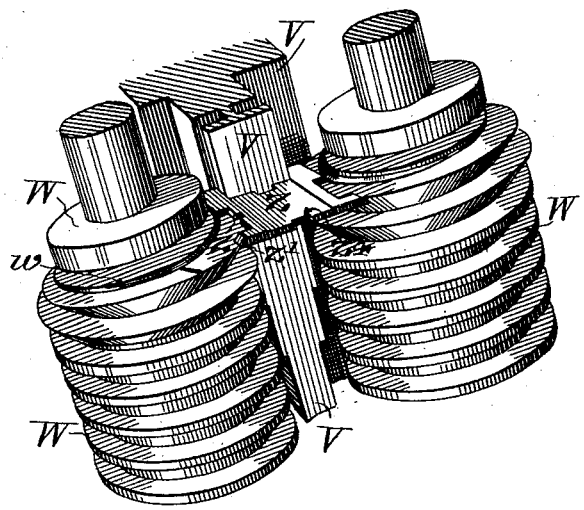
Figure 28:
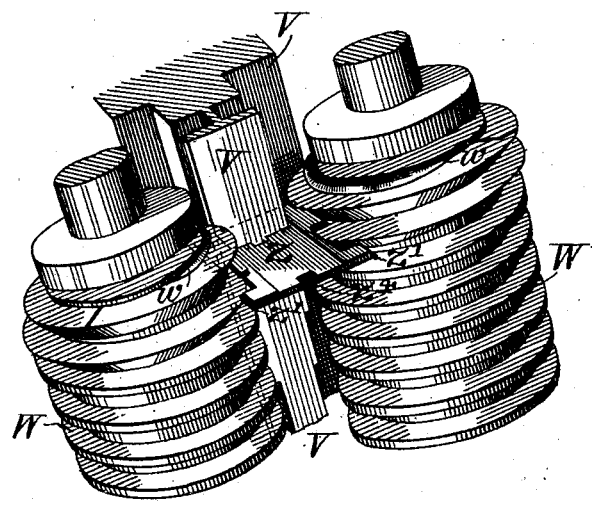
Figure 29:
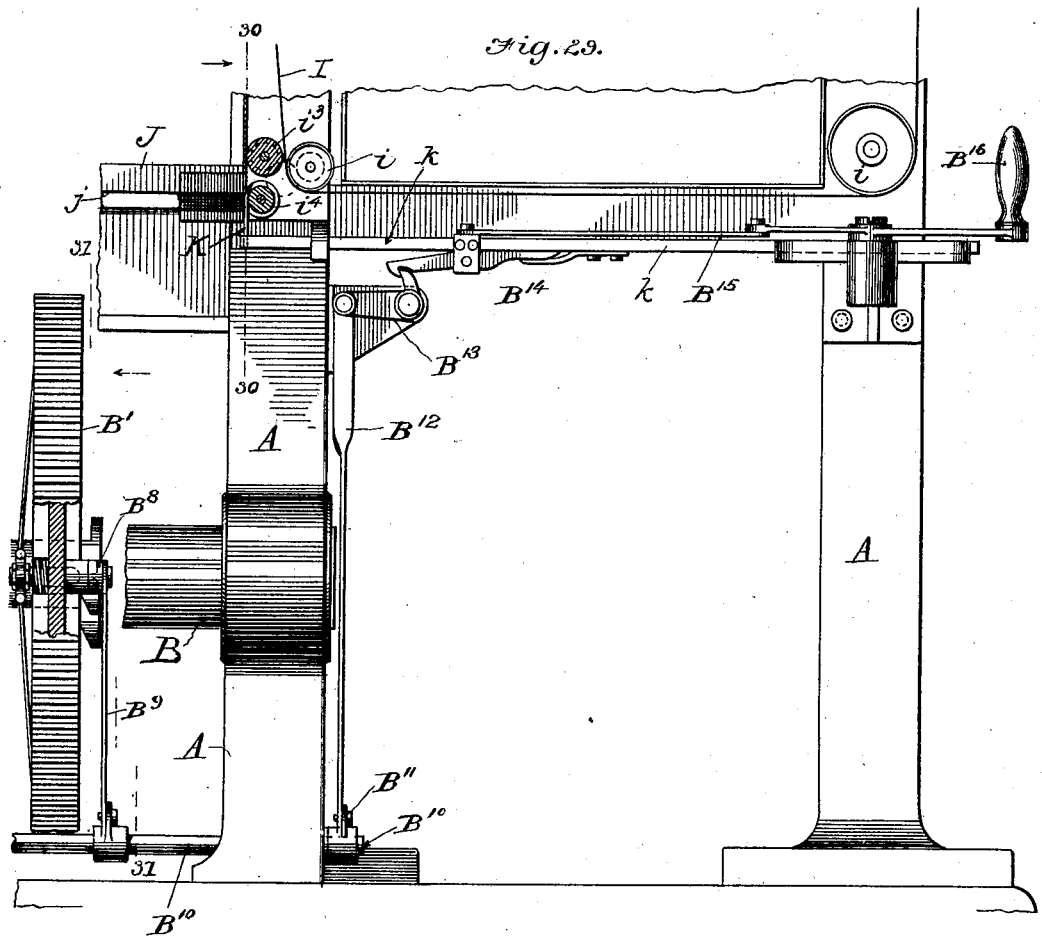
Figure 30:
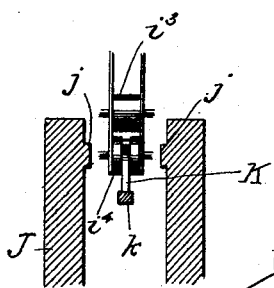
Figure 31:
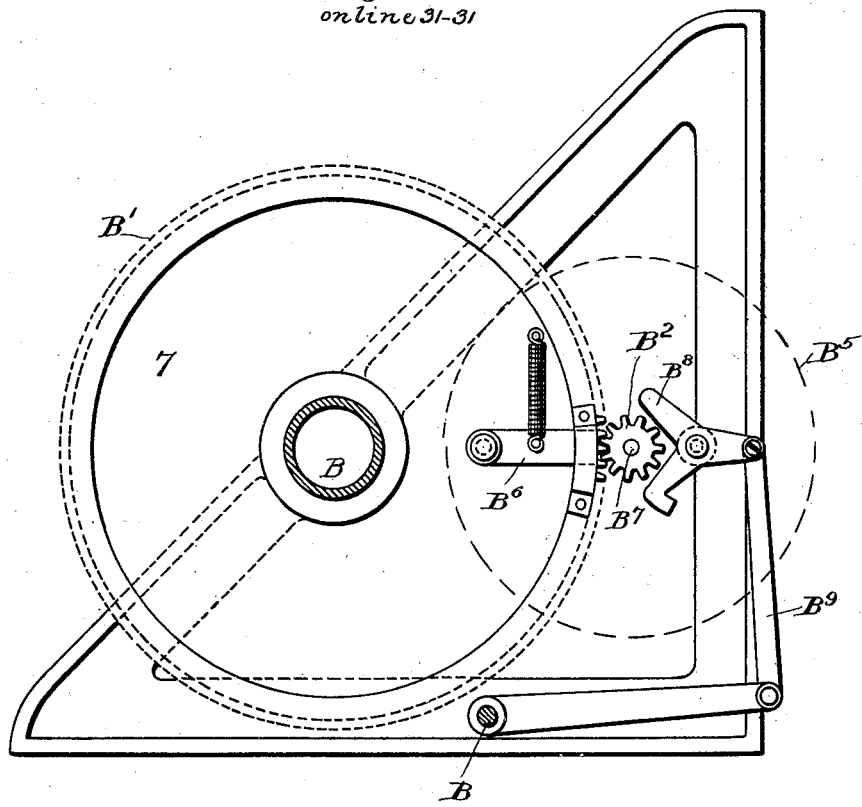
Figure 32:
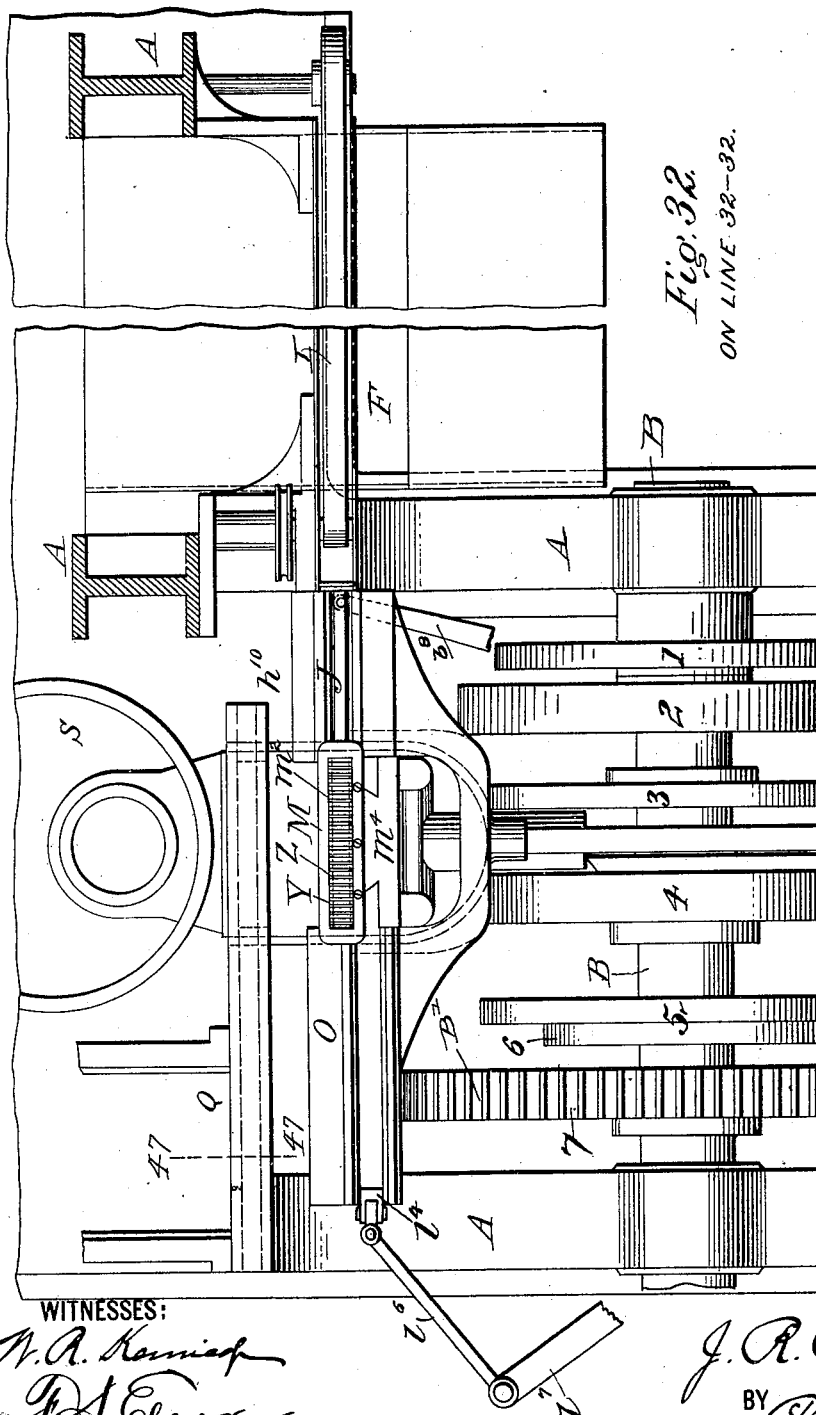
Figure 33:
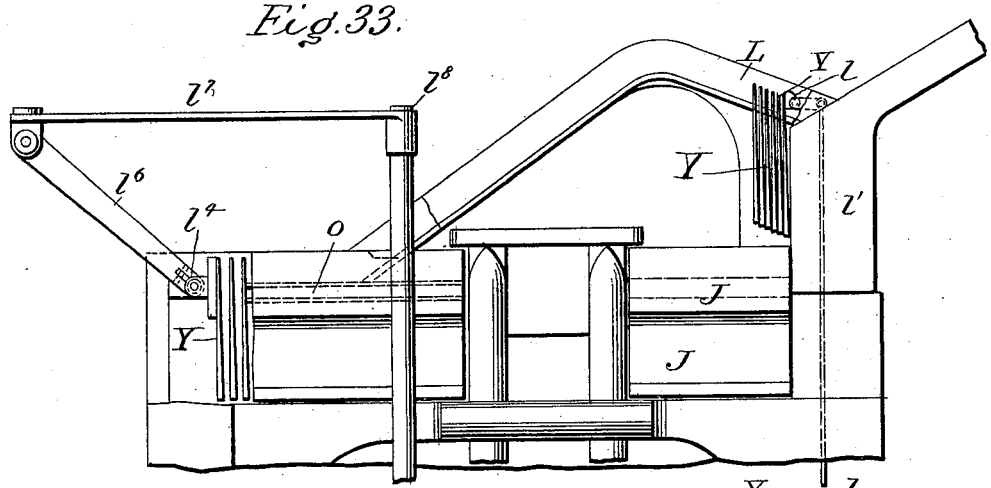
Figure 34:
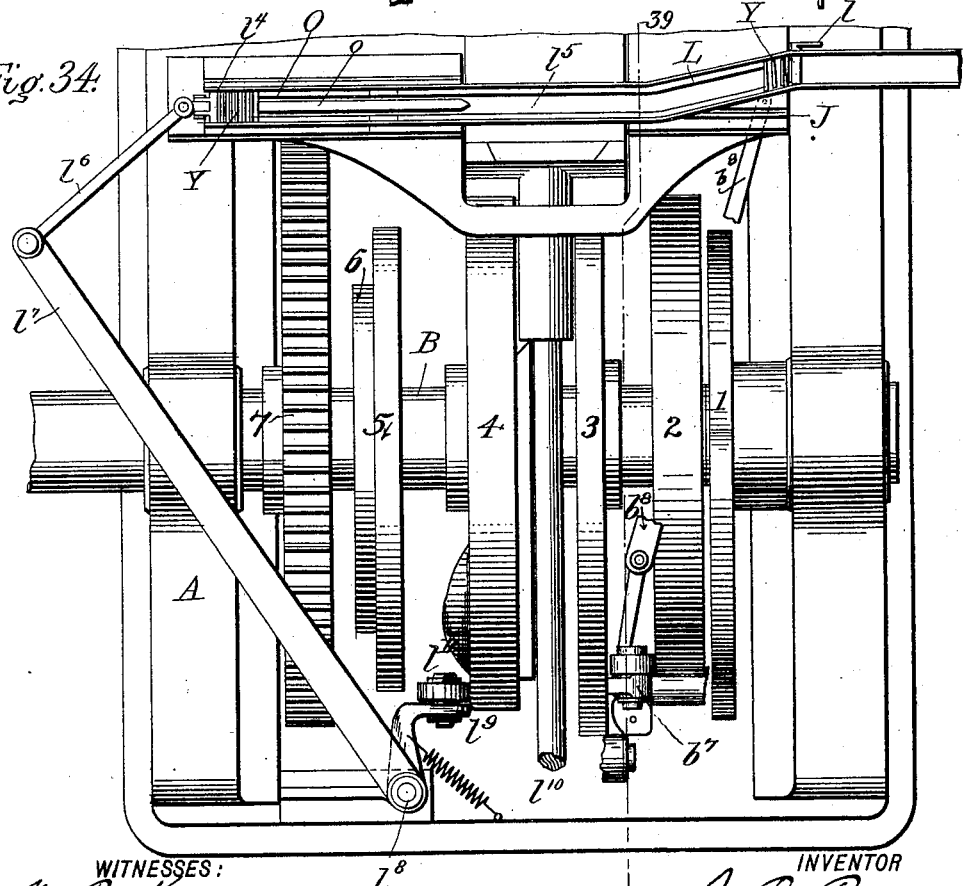
Figure 35:
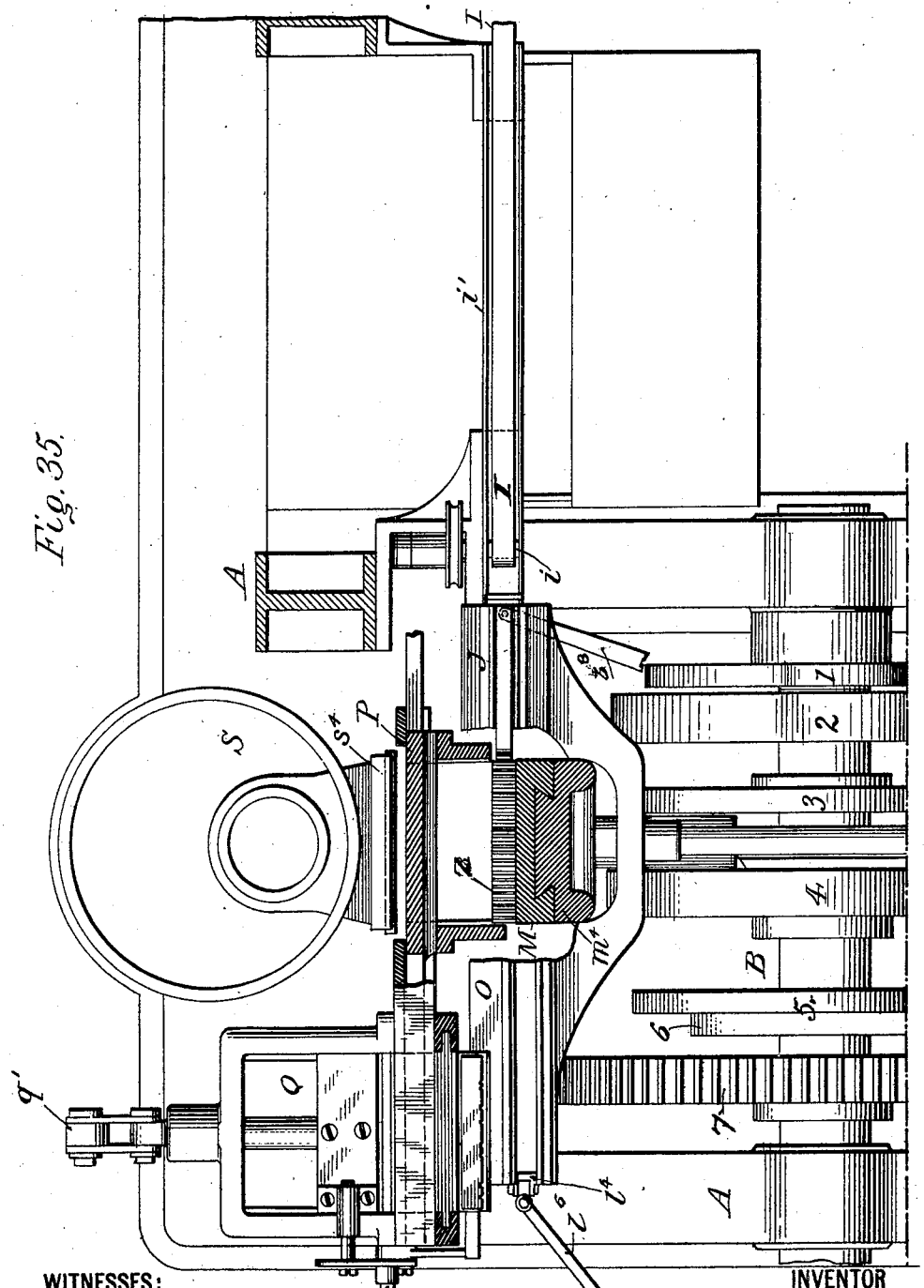
Figure 36:
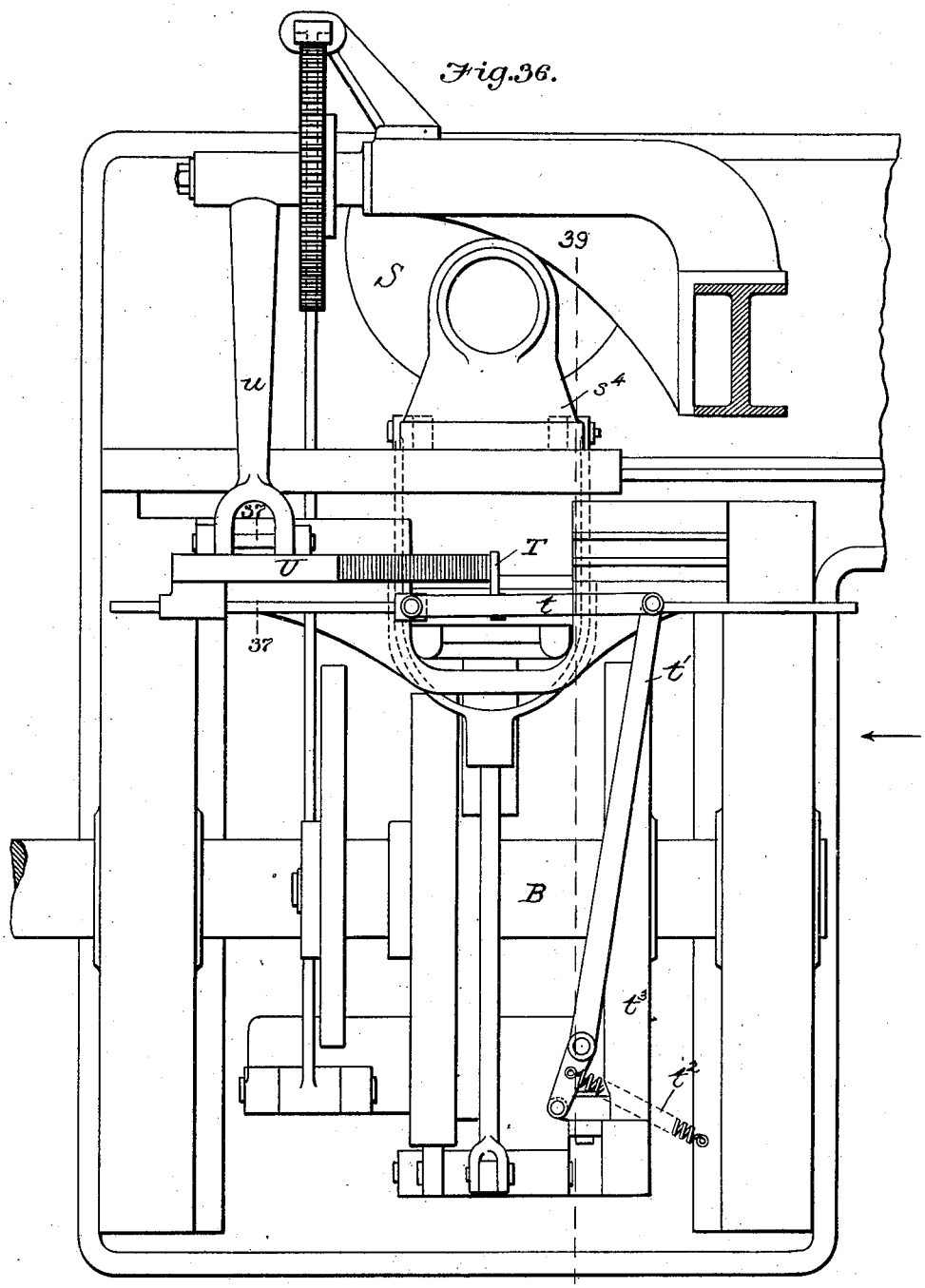
Figure 37:
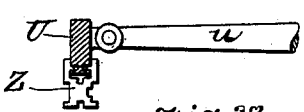
Figure 38:
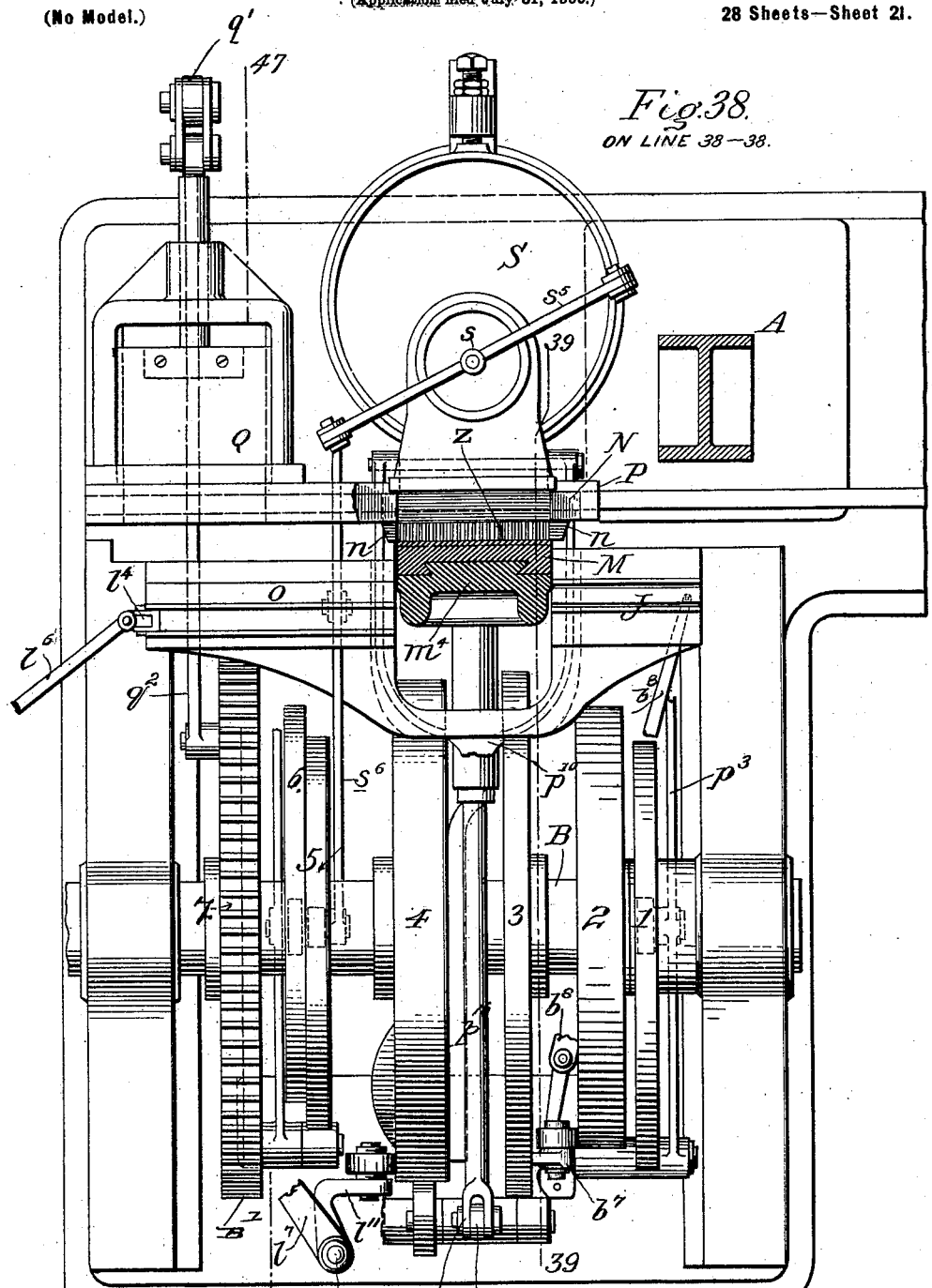
Figure 39:
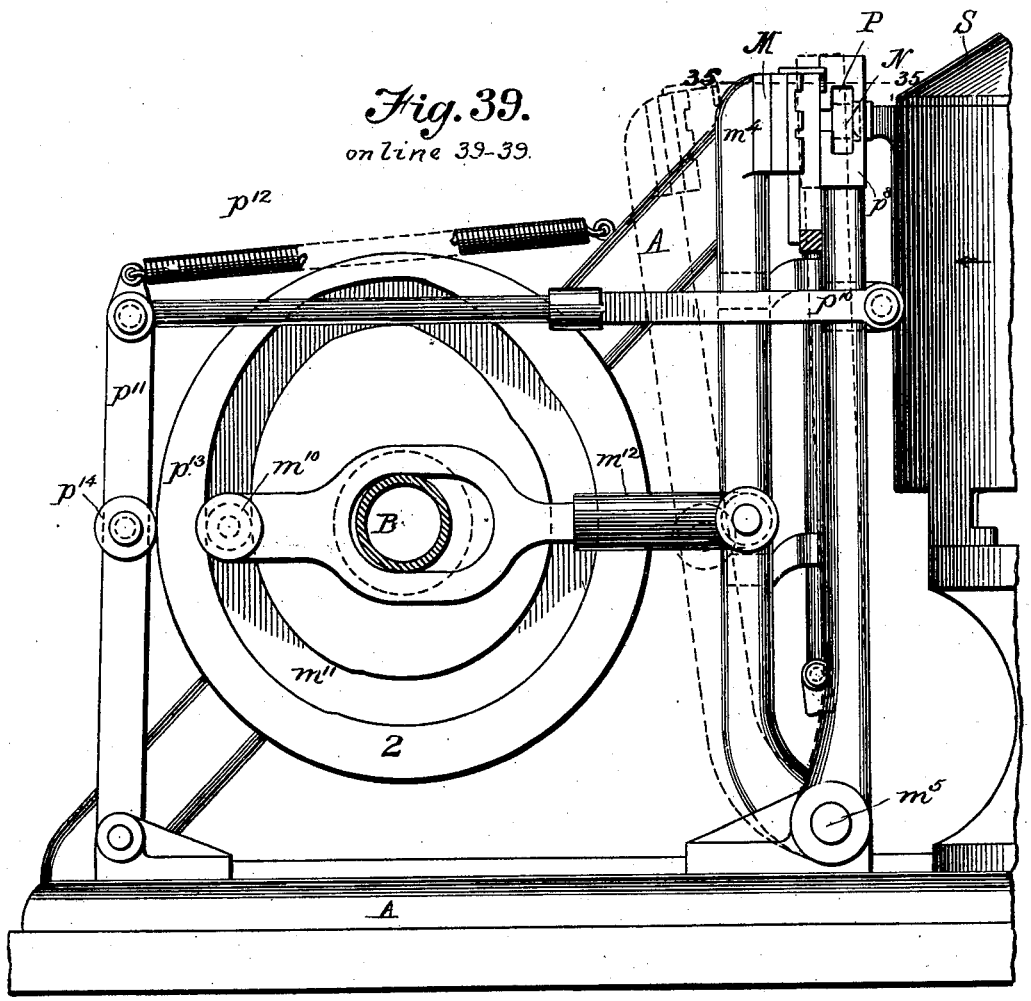
Figure 48:
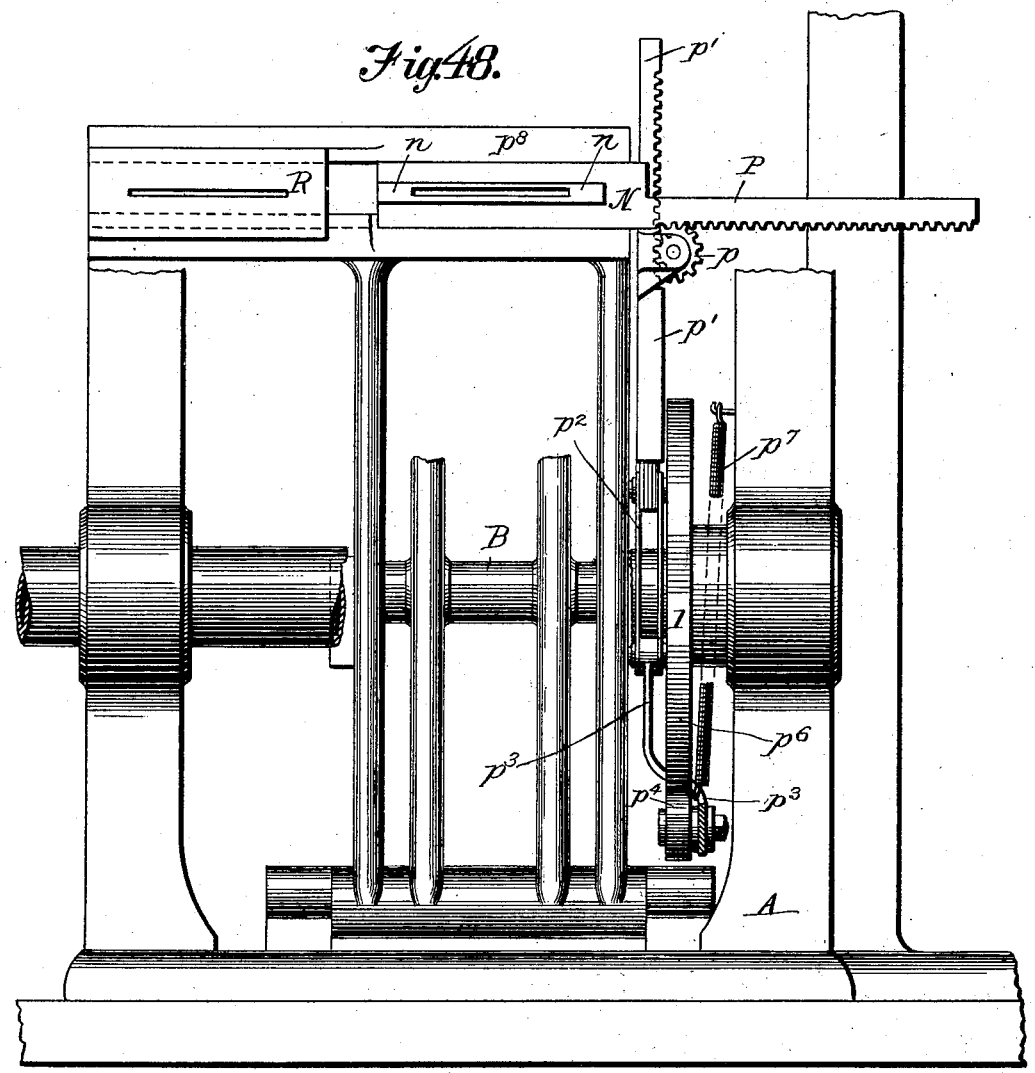
Figure 49:
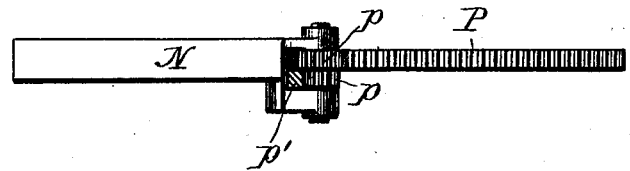
Figure 52:
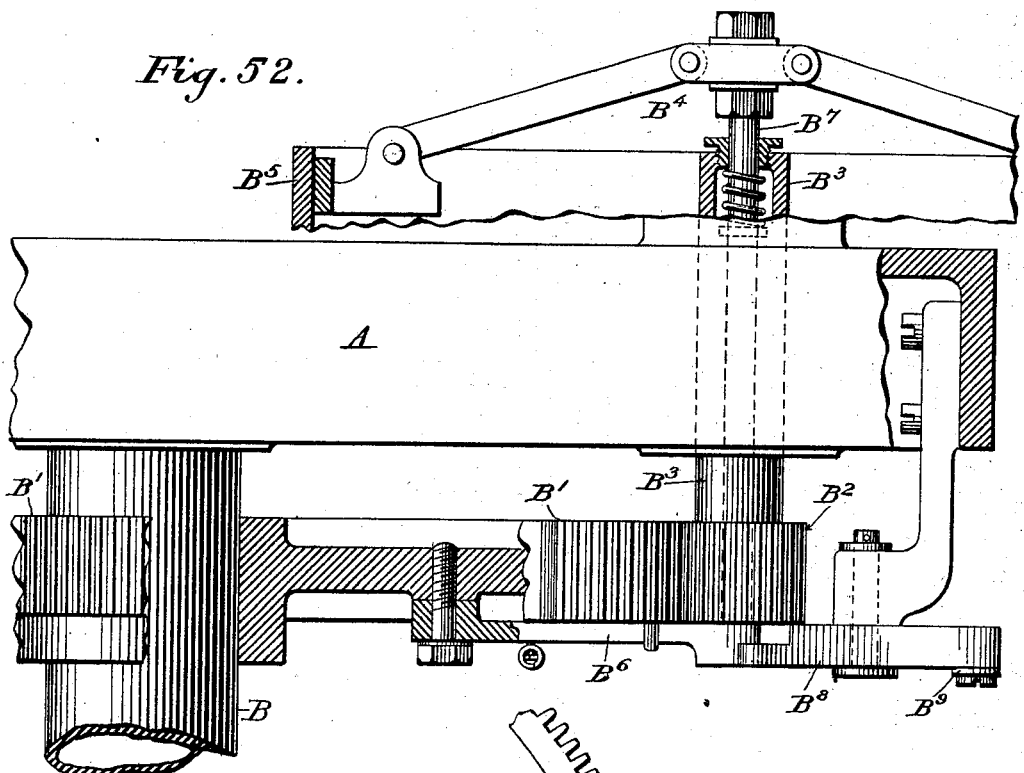
Figure 53:
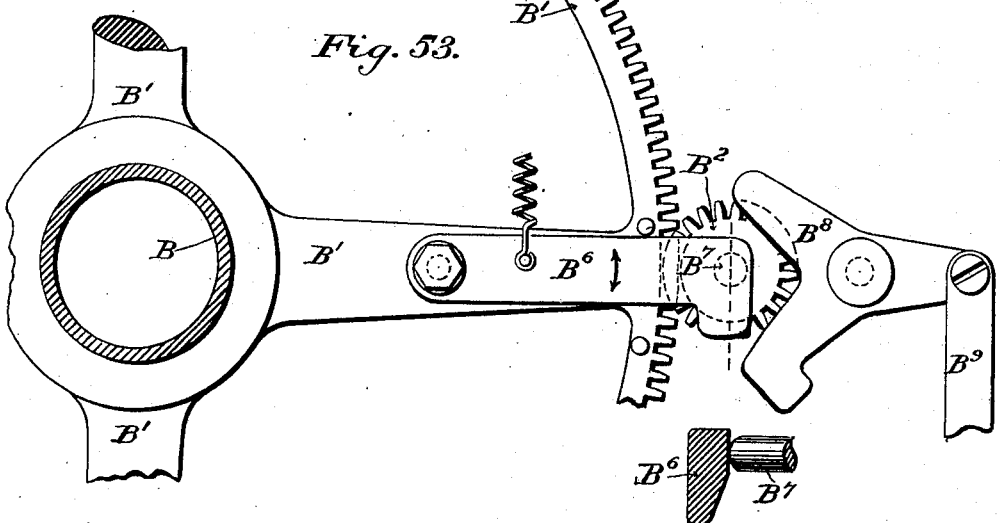

Figure 1 is a front elevation of the machine. Fig. 2 is a side elevation of the same looking from the right. Fig. 3 is a similar view with the distributer, the magazine, and a portion of the keyboard shown in vertical section on the line 3 3 of Figs. 1 and 4. Fig. 4 is a rear elevation of the machine. Fig. 5 is a vertical section from front to rear on the same line as Fig. 3 on the line 3 3 of Figs. 1 and 4, showing, on an enlarged scale, the distributer, the magazine, and means for delivering the matrices from the latter to the assembler. Fig. 6 is a vertical section from front to rear on the same line as Figs. 3 and 5, illustrating, on an enlarged scale, the construction of one of the magazine-rails, from which the matrices are suspended, the adjacent portion of the distributer, and the escapement for delivering the matrices one at a time. Fig. 7 is a similar view showing the escapement in a similar position and in the act of delivering a matrix. Fig. 8 is a cross-section on the line 8 8 of Figs. 3, 5, 6, and 7, illustrating particularly the form of the distributer-rail and escapement and the manner in which the matrix is delivered from the latter. Fig. 9 is a perspective view of a portion of the distributer-bar, by which the matrices are divided into groups and delivered to the secondary distributing devices below. Fig. 10 is a perspective view illustrating two magazine-rails to sustain the matrices, together with the adjacent distributer-plate, through which the matrices pass to the rails, the escapements being omitted to expose other parts to view. Fig. 11 is a perspective view from the opposite side of the parts illustrated in the preceding figure, together with the escapement devices and matrices. Fig. 12 is an elevation of the matrix assembling or composing mechanism looking from the front, the conveying-belt and assembling devices at its lower end being shown in vertical section. Fig. 12$^a$ is a vertical cross-section on the correspondingly-numbered line of Fig. 12, showing the form of the assembler-block, in which the matrices are assembled or composed in line. Fig. 12$^b$ is a view looking toward the assembling devices from the left, as indicated by the correspondingly-numbered arrow in Fig. 12. Fig. 13 is a horizontal section on the correspondingly-numbered line of Figs. 1, 2, 3, 4, 5, &c. Fig. 14 is a front face view of the secondary distributer. Fig. 15 is a perspective view of one of the sections or rails of the secondary distributer. Fig. 16 is a cross-section of the same on the line 13 13 of the preceding figure and Figs. 1, 2, 3, 4, 5, 6, 10, 11, 14, &c. Figs. 17 to 20, inclusive, are perspective views showing four matrices of one group and illustrating their variations in form for the purposes of distribution. Fig. 21 is a side elevation of the first distributer, by which matrices are subdivided into groups preparatory to their final distribution, and the matrix-conducting mouths thereunder. Figs. 22 and 23 are vertical cross-sections through one end of the first distributer, showing in different positions the parts for separating the matrices as they are carried onto the distributer-bar, the sections being taken on the line 22 22 of Figs. 1, 4, 21, 24, and 25. Figs. 24 and 25 are top plan views illustrating, respectively, the parts represented in Figs. 22 and 23. Fig. 26 is an end view of one of the distributer-screws, showing the formation of the thread at its receiving end, whereby it is adapted to aid in separating the matrices and convey them along the distributer-bar. Figs. 27 and 28 are perspective views looking in an upward direction against the first distributer-rail and the feed-screws and illustrating the manner in which each matrix is carried separately along the rail. Fig. 29 is a vertical section sidewise of the machine, on the same plane as Fig. 12, through the lower part of the assembling or composing mechanism and the adjacent parts for the purpose of showing more particularly the stopping and starting mechanism. Fig. 30 is a vertical section on the line 30 30 of the preceding figure. Fig. 31 is a vertical cross-section on the line 31 31 of Fig. 29 and showing more particularly the driving connections. Fig. 32 is a plan view showing part of the assembling and casting mechanism, including means for locking the composed line and the various operating-cams, looking downward from the line 32 32 on Figs. 1, 4, &c., portions of the main frame being shown in section. Fig. 33 is a view looking rearward from the front of the machine in the direction of the arrow 33, Figs. 2 and 3, showing more particularly the mechanism for delivering the spacers into the line in course of composition and for returning them after use to their magazine. Fig. 34 is a top plan view of the parts represented in the preceding figure, the main operating-cams, line-shifting devices, and other parts being also shown. Fig. 35 is a plan view, similar to Fig. 32, but from a lower level, on the line 35 35 of Figs. 39 and 42, showing more particularly the melting-pot, the mold, and the ejector for the slugs. Fig. 36 is a plan view looking downward from the line 36 36, Figs. 1 and 4, showing more especially the mechanism for transferring the composed line of matrices after the casting operation to the elevator, by which they are delivered to the distributer. Fig. 37 is a cross-section through the matrix-elevating bar or head on the correspondingly-numbered line of Figs. 4, 36, &c. Fig. 38 is a plan view looking downward from the line 38 38 of Figs. 1, 2, 3, 4, &c., showing particularly the matrix-clamping devices and casting mechanism, the ejector, and the parts for imparting motion thereto. Fig. 39 is a side elevation of the casting mechanism and attendant parts looking toward the left side of the machine from the line 39 39, Figs. 32, 34, 36, and 38. Fig. 40 is a rear elevation of the mechanism for sustaining and justifying the line of matrices in front of the mold looking in the direction indicated by the arrow 40 in Figs. 36 and 39. Fig. 41 is a vertical section through the parts shown in the preceding figure from right to left on the line 41 41, Figs. 38, 39, 42, &c. Fig. 42 is a vertical section from front to rear through the mold and adjacent parts of the casting mechanism on the line 42 42 of Figs. 38, 40, and 41. Fig. 43 is a section on the same line as Fig. 42, showing one end of one of the spacers and the bar for operating the same. Fig. 44 is a side view of one of the wedge spacers. Fig. 45 is a view of the upper end of the same looking from the opposite side. Fig. 46 is a cross-section on the line 46 46 of the two preceding figures. Fig. 47 is a vertical section from front to rear through the ejector and slug-trimming devices on the line 47 47 of Figs. 1, 4, 32, and 38. Fig. 48 is a front elevation showing the mold and adjacent parts and the means for shifting the mold from the casting to the ejecting position, and vice versa. Fig. 49 is a bottom plan view of the mold-slide and parts for moving the same. Fig. 50 is a front elevation illustrating the manner in which the matrix-elevator lifts the line of matrices away from the spacers, leaving the latter in position for transference to their magazine. Fig. 51 is a cross-section on the line 51 51 of the preceding figure. Fig. 52 is a top plan view, partly in section, of the main driving-pulley and its immediate connections; and Fig. 53 is a side view of the parts shown in the preceding figure.

My machine comprises as its leading elements the following mechanisms: first, a magazine for the matrices consisting, mainly, of a series of inclined bars, from which the matrices in storage are suspended by lips or teeth at their upper ends, the bars being rigidly sustained in such manner that the matrices may be received at their upper ends, may slide downward thereover, and escape at the lower ends, one at a time, as they are released by escapement devices connected with and operated by a series of finger-keys; second, an assembling or composing mechanism by which the matrices released from the magazine rails or bars are directed downward and composed or assembled in line side by side, together with suitable spaces; third, a casting mechanism to which the composed lines of matrices and spaces are delivered and by which a line is clamped and justified against the front of a mold into which the molten type-metal is delivered from the melting-pot to produce a slug or linotype, and, fourth, a distributing mechanism by which the matrices are transferred from the mold and delivered to the magazine-rails from which they started, this distributing mechanism comprising as leading features a longitudinally-toothed rail along which the matrices are carried in suspension and by which they are divided into groups and delivered to a secondary distributer, consisting of inclined plates or bars having therethrough openings differentiated in form, so that the matrices sliding downward thereover are permitted to pass through the upper openings to engage the magazine-rails.

Incidental to the foregoing features there are minor features which will be hereinafter explained in detail.

I provide as the basis of my machine a series of metal matrices Z, such as shown in detail in Figs. 17 to 20, each having in one edge an intaglio character or matrix proper, $z$, and having in the upper and lower ends notches or recesses varying in form for the purpose of effecting the distribution of the matrices to their appropriate places in the magazine, as hereinafter explained. I also provide for use in connection with these matrices a series of double wedge spacers Y, such as shown in Figs. 44 and 45.

The entire machine is constructed with reference to the handling of these matrices and spacers.

Referring now to the construction of the machine, A represents a rigid main frame the parts of which may be constructed and united in the form and manner herein shown or in any other form and manner which will give support to the various operative parts hereinafter described. In the form shown the main frame consists principally of two upright parallel standards which give support to the principal parts, the cross-bar at the top to sustain the distributer, and two small parallel brackets at the base to sustain the main driving-shaft B, which is mounted horizontally in bearings therein, all of the cams for imparting motion to the principal parts of the machine being mounted on this one shaft, as hereinafter more fully described.

The magazine in which the matrices are held in storage consists, as shown in Figs. 2, 3, 5, 6, 10, &c., of a series of fixed inclined rails C, having longitudinal ribs along their lower edges, as shown in Fig. 8, for the purpose of engaging beneath the ears of the matrices, which are freely suspended from the rails, as shown in Fig. 6, the inclination of the rails being such that the matrices received at their upper ends will slide downward by gravity and escape when released at the lower end. Each of these magazine-rails C is attached at its upper end to a rigid cross-bar $c$, forming part of the framework, and its lower ribbed portion is presented directly opposite an opening $d'$ in an inclined distributer D, so that a matrix passing through this opening from the front of the distributer-plate has its ears automatically engaged with the rails C, which thereafter serve as the sole support of the matrix until it is released. There are a large number of the magazine-rails C arranged in vertical and horizontal rows, each rail intended to receive a series of matrices bearing the same characters, while matrices bearing different characters are received and carried on different rails.

Any suitable escapement devices may be employed for releasing the matrices one at a time from the magazine-rails in the order in which their characters are to appear in the lines of print. I recommend, however, the escapement shown in the drawings, one of which is mounted on and sustained by the lower end of each rail. This device consists simply of a horizontal rock-shaft E, longitudinally grooved in one side and seated at its inner end to turn in the rail C, while its outer end is sustained by the overhanging arm or bracket $e$, fastened to the top of the rail C above the path of the matrices. As the rock-shaft E is rotated in a forward direction its groove or notch receives the upper edge of the foremost matrix and carries it forward until it is finally released from the groove, as shown in Fig. 7, so that it may escape from the rail by gravity, the next matrix being held back by the unbroken surface of the shaft, as shown in Fig. 7. Thus it will be seen that each rotation or oscillation of the shaft E effects the release of one matrix. The arrangement of the grooved escapement-shaft E in a horizontal position over the upper ends of the matrices and at right angles to the bars from which the matrices are suspended is of special advantage in that the shafts thus arranged serve to hold the faces of the matrices at right angles to the length of the bar, so that it is impossible for them to turn, twist, or assume oblique positions on the bar. Experience has shown that in the use of wide pendent matrices embracing a supporting-bar at the top much difficulty is experienced if they are permitted to turn or twist thereon, the effect of such movement being to cause the binding of the matrices on the bar and to prevent them from feeding down steadily and escaping quickly, as required. I am aware that a vertical notched escapement has been used to engage one side of a matrix suspended from a wire, but such escapement cannot be practically used with matrices and sustaining-rails such as herein described. As a means of rapidly operating the rocking escapement and securing the requisite movement by a very short movement of the finger-key I provide it on the outer end with a pinion $e^2$, engaging a sector-pinion $e^3$, which is mounted on the arm or bracket $e$, before referred to. This sector-pinion is moved in one direction by a spring $e^4$ and in the opposite direction by a wire or rod $e^5$, connected thereto and extending downward to the rear end of a finger-key F, which is centrally pivoted in the frame, as clearly shown in Fig. 3. The use of the multiplying-pinions between the finger-key and the escapement is important in that it permits the escapement to be operated with great rapidity and by a very short movement of the keys, the effect being not only to release the matrix, but to give it a forward impetus, so that it is certain to be delivered quickly. It will be understood, of course, that there are as many escapements as there are magazine-rails and that there are a like number of finger-keys each representing one character and effecting the delivery of matrices singly from one magazine-rail.

As the matrices are delivered from the various magazine-rails in rapid succession and at many different points, means must of course be provided for bringing them together in the proper sequence in a common line. For this purpose I mount in the main frame a series of upright troughs or chutes G, one behind and beneath each vertical row of magazine-rails, as plainly shown in Figs. 3, 4, 5, 12, and 13, so that each matrix released is received in one or another of these chutes or channels. The descent of the matrices through the channels may be expedited by means of endless belts H, each arranged to travel around sustaining-pulleys $h$ $h$ and to travel lengthwise through the bottom of one of the chutes, so that the matrices falling into the chutes will be received upon the belt and carried downward and forward therewith. Beneath the lower ends of the series of chutes I arrange, as shown in Figs. 1, 2, 4, 12, &c., a transverse carrier-belt I, extended around a series of sustaining-pulleys $i$ and having a downward inclination to the left, so that all of the matrices descending the chutes are received upon this belt and carried rapidly one after another downward to the left and into the assembling devices presently to be described.

It will be observed that the matrices descending from above must be given a partial rotation—in other words, a quarter-turn—to admit of their lying longitudinally and flatly on the lower carrier-belt I. This is effected, as shown in Figs. 1, 12, &c., by connecting to the lower end of each chute G a tubular continuation $g$, which is flattened and given a quarter-turn between its upper and lower ends, so that the matrices descending therethrough are each turned into position to fall flatly on the belt I. This belt I passes through a trough-like guide or channel $i'$, the purpose of which is to keep it from sagging and to prevent the matrices from escaping from its edges. At the lower end of the belt I, I propose to use devices of any ordinary or appropriate character for receiving the successive matrices and spaces one after another and assembling them in line side by side. In the present instance, as clearly shown in Fig. 12, the matrices slide down through a narrow passage $i^2$ in front of two horizontal rolls $i^3$ and $i^4$ until arrested by contact with a stop-shoulder $i^5$, whereupon they are crowded forward to the left into the assembler J, which is grooved or channeled vertically from right to left and provided in its inner walls with horizontal ribs $j$ (see Figs. 12, 12$^a$, 29, and 30) to engage under the shoulders of the matrices and maintain them in line horizontally. The assembling-rolls $i^3$ and $i^4$ are constructed of or covered with rubber or similar elastic material, so that they act with yielding pressure on the descending matrices, urging them downward into position at the end of the line. The lower roller $i^4$ stands in such relation to the end of the assembler (see Figs. 12, 29, and 30) that each matrix drawn downward by the roll is crowded into place between the roll and the preceding matrix, the line being gradually forced ahead in the assembler as the successive matrices are added to it. The lower assembler-roll $i^4$ is circumferentially grooved to admit the vertical finger K on the end of a horizontal slide $k$, so that when the composition of the line is completed the movement of the slide to the left will cause this finger to push the matrix-line forward to the left out of the assembler into supports by which it is presented to the mold, as hereinafter described.

During the composition of each line spacers Y must be inserted at proper points between the matrices. These spacers are suspended between fixed magazine-rails directly over the assembler J, as shown in Figs. 33 and 34, and a pivoted rocking dog $l$, connected by rod $l'$ with a finger-key, serves to release the spacers one at a time, so that they may fall into the assembler below. The manner in which they are distributed or returned to their magazine will be hereinafter described.

When the completed line of matrices and spacers is transferred from the assembler J, it is received in the line-support M, whereby the matrices and spacers are sustained and presented to the face of the mold with which they are to coöperate. This line-support consists, as shown in Figs. 39, 40, 42, &c., of a metal plate having a groove cut horizontally across its rear face of suitable shape and size to receive the matrices and with a top portion which extends rearward and downward to engage over the rear faces of the matrices and hold them forward in the groove above referred to, the matrices being thus held firmly, so that they cannot fall out of position, while at the same time they are free to move laterally during the justifying action.

The top flange of the line-holder M, which, as above mentioned, extends rearward above the line of matrices, is provided with a vertical slot $m^2$ of suitable width to permit the upper ends of the wedge spacers Y to rise therethrough, if necessary, for justification.

The line-carrier as a whole is dovetailed and arranged to slide vertically on the upper end of a supporting-frame $m^4$, arranged to swing forward and backward on a horizontal axis $m^5$ at its lower end. After the line is received in the holder M the frame swings rearward and carries the rear faces of the matrices tightly against the front face of the mold N, between the shoulders or abutments which limit the expansion of the line, as shown in Fig. 42 and elsewhere.

While the matrices are in contact with the mold they are brought to an exact alinement vertically by slightly lifting the support M, in order to bring the lower ears of the matrices into intimate contact with the under edge of the mold, which is made straight and true for the purpose. This rising motion of the line-support (see Fig. 42) is effected by a lever $m^6$, pivoted to the frame $m^4$ and engaging the line-support, motion being communicated to this lever $m^6$ by link $m^7$, connected to the angular lever $m^8$, which is also pivoted to the swinging frame $m^4$, the lower end of the lever being acted upon by a cam plate or projection $m^9$ on the edge of a large cam on the main shaft.

The forward-and-backward movement of the frame $m^4$ is effected, as shown in Fig. 39, by a bar $m^{12}$, jointed at its forward end to the frame $m^4$, slotted at its rear end to straddle the main shaft B, by which it is guided, and provided at its extreme rear end with a stud or roller $m^{10}$, protruding into a cam-groove $m^{11}$ in the side of the large cam or wheel on the main shaft, the rotation of this cam serving to give the frame $m^4$ and the line support thereon three successive positions—first, a position in line with the assembling-channel J, that the matrices may be received therethrough; second, a forward position to present the matrices against the mold, and, third, a position in the rear of its original position, in order that the matrix-line may be transferred from the holder M to a receiving-channel O. (Clearly shown in Fig. 32.)

The mold N is in the form of a plate having therethrough from front to rear a slot or mold proper of the exact dimensions of the required linotype and with two shoulders or lips $n$ extending forward at the ends of the slot to serve as jaws or abutments to limit the elongation of the matrix-line when the spacers are thrust upward therethrough to effect the justification. These shoulders or abutments may, if preferred, be formed on the mold-carrier P, and they may be stationary or adjustable to suit the different lengths of line. As shown in Fig. 48 the mold is removably mounted in a horizontal slide P, this arrangement permitting the mold to be placed first in its operative position behind the matrix-line, as shown in Figs. 38, 42, &c., and of its being carried thereafter horizontally to the left in order to present the contained slug in front of the horizontally-reciprocating ejector-blade Q, (See Figs. 38, 47, &c.,) which, advancing from the rear, drives the slug forward out of the mold and between the fixed trimming-knives R to a galley or receiver at the front.

The horizontal to-and-fro motion of the mold is effected, as shown in Figs. 48 and 49 by cutting in one end of its carrier P gear-teeth, which engage the horizontal pinion $p$, actuated by a vertically-reciprocating rack-bar $p'$, which is guided in the frame and connected at its rear end by links $p^2$ to one end of a lever $p^3$, this lever carrying a lateral stud or roller $p^4$, acted upon by a depressing-cam $p^6$, mounted on the main shaft and acting in opposition to a spring $p^7$, which lifts the lever and rack-bar as they are relieved from the cam. It will of course be understood that this cam is of such shape that the mold is held at rest for suitable periods of time while in the casting and in the ejecting positions.

After the casting of the slug in the mold is effected it is necessary to move the mold forward away from the pot in order to break the slug away from the metal in the mouth of the pot. I provide for this forward-and-backward motion of the mold by mounting its carrier P to slide in a horizontal groove in a supporting-frame $p^8$, (see Figs. 39 and 48,) arranged to swing forward and backward on the horizontal shaft $m^5$, already referred to. This frame is actuated, as shown in Figs. 39, &c., by a connecting-rod $p^{10}$, jointed thereto and extending rearward to the upper end of a lever $p^{11}$, the lower end of which is jointed to the base-frame. This lever is pulled rearward to carry the mold toward the pot by a spring $p^{12}$, connecting it with the frame, as shown in Fig. 39, and it is moved in the opposite direction by the periphery of the cam-wheel $p^{13}$, mounted on the main shaft B and arranged to act against a roller $p^{14}$ on the lever. The guides to sustain the ejector-blade Q are also attached to and sustained by the swinging frame $p^8$, as shown in Fig. 47.

Behind the line-support M and behind the position occupied by the mold during the casting period there is located a stationary melting-pot S, hereinabove referred to. This pot, which may be of any suitable form and size adapted to contain an ample supply of type metal, will be heated by means of a burner of any suitable form thereunder. It is provided, as usual in such machines, with a delivery mouth or throat $s^4$, adapted to fit tightly against and deliver metal into the rear side of the mold, and with a plunger or piston $s$, by means of which the delivery of the metal through the mouth is effected. This plunger is actuated by a lever $s^5$, connected to one side of the pot, as shown in Fig. 38, and actuated by jointed connection to a lever $s^6$, receiving motion from the cam $s^7$ on the main shaft. After the slug has been cast the matrix-support M moves forward into alinement with the stationary guide O, which is vertically channeled, so that it is adapted to receive the matrices and spacers. At the time the line is thus transferred into the guide O a vertically-movable elevator-bar U stands directly over the guide, as shown in Fig. 36, and in such position that as the matrices are shifted to the left the teeth on their upper ends will engage the lower flanged edge of the elevator, so that when the latter is lifted, as presently to be explained, toward the distributer at the top of the machine, it will lift the entire series or line of matrices, leaving the spacers behind, as clearly shown in Figs. 50 and 51.

In order to sustain and hold the spacers, a horizontal bar or finger $o$ is sustained at its left end in the guide O, so that as the line is carried into the guide the finger $o$ will pass through the slots in the spacers below the matrices in order to keep the spacers from rising with the matrices and to sustain them after the matrices are lifted away. The manner in which the spacers are thus left in suspension on the finger $o$ is clearly shown in Figs. 50 and 51. It is of course necessary that these spacers should be returned to the magazine or holder L, from which they were delivered into the line. The mechanism for this purpose is shown in detail in Figs. 33 and 34, in which $l^4$ represents a horizontal slide or pusher by which a series of spacers are pushed forward to the right from the finger $o$ and upward over an inclined rail $l^5$, leading to the upper end of the magazine L, into which they descend by gravity. The pusher $l^4$ is actuated by a link $l^6$, jointed to the end of a horizontal crank-arm $l^7$ on the top of a vertical rock-shaft $l^8$, this shaft being seated in the main frame and actuated at its lower end by an arm $l^9$, urged in one direction by spring $l^{10}$ and in the opposite direction by a projection $l^{11}$ on the side of a cam-wheel on the main shaft.

It will be understood from the foregoing that after the spacers have served their purpose and been transferred to the finger $o$ after the matrices are lifted away from them they are pushed up the rail $l^5$ to the magazine, from which they started and from which they are delivered into succeeding lines of matrices. In order to insure the proper delivery of the matrices, the guide-rails $l^5$ have their extreme lower ends pivoted in order that they may drop down and stand in position to engage with certainty under the shoulders or ears of the spacers as the latter are moved forward by the pusher.

When the matrix-line is passing into the guide O, the hinged ends of the rails $l^5$, which are, in effect, switches, rise up and let the matrices and spacers pass them.

Reference has already been made to the justification of the line of matrices in front of the mold by the upward movement of the wedge spacers therethrough. These spacers are very similar to those now used in the commercial linotype-machines, and, as shown in detail in Figs. 44 and 46, each spacer consists of a long wedge-shaped body $y$ and a shorter and oppositely-tapered wedge $y'$, connected thereto by a dovetail joint, so that the longer wedge may slide upward through the line in relation to the short wedge and the matrices. The upper end of the short wedge is widened to form sustaining-shoulders $y^2$, as usual. Unlike the spacers in common use the present device is provided with notches $y^3$ in opposite sides of the longer wedge, at its lower end. When the matrix-line is carried laterally into position in front of the mold, the lower ends of the spacers pass over the justifying-bar $y^4$, (see Figs. 42 and 43,) which has upwardly and inwardly extending lips $y^5$, which enter the grooves $y^3$ in the wedges. When the bar $y^4$ is lifted to force the wedges upward through the line, the matrices and wedges are clamped tightly together, so that the wedges will not fall by gravity. It is for this reason that the spacers are notched and the lips $y^5$ arranged to engage therein, so that when the lifting-bar $y^4$ is carried downward it will draw the spacers downward through the line to their original positions, thus leaving the line loose or free between the side abutments $n$, so that when the line-support M retreats the matrices may be withdrawn without resistance from between the abutments. The lifting or justifying bar $y^4$ is carried on the upper end of a rod $y^{12}$, guided in projections on the frame $m^4$, this lever being connected at its lower end by links to a lever $y^6$, mounted on a horizontal axis $y^7$ in the base-frame. This lever and the bar are raised to effect the justification by a spring $y^8$, connecting the lever and main frame. The ascent of the bar is controlled, however, by a peripherally-stepped cam $y^9$, arranged to act on a roller $y^{10}$ on the side of the lever $y^6$. This cam is so arranged that it permits the justifying-bar to rise against the spacers repeatedly each time to a greater elevation than the previous time. The purpose of this action is to drive the spacers through the line by repeated blows and to draw the bar $y^4$ away from the spacers between one blow and the next in order that the spacers, which move laterally with the line and which are sometimes sprung or bent laterally by frictional contact of their lower ends with the bar $y^4$, may assume vertical positions. In other words, it is to prevent the lateral tension upon and the lateral bending of the spacers which would be liable to occur if they remained in frictional engagement with the bar $y^4$ during the entire period of justification and while their upper ends are being carried sidewise with the moving matrices. The periphery of the cam is so shaped that at the proper time the lever $y^6$ and the justification-bar are pulled down to and held in their original and normal positions. In order to prevent the spacers from twisting or turning horizontally out of position, the justifying-bar $y^4$ is provided with a central vertical rib $y^{11}$, (see Fig. 43,) which enters notches formed centrally in the lower ends of the spacers.

Passing now to the distribution of the matrices and their return to the magazine from which they started, reference has already been made to the fact that when the matrix-line, after being moved forward away from the mold, is transferred to the left into the guide O the upper ends of the matrices engage with the elevator-bar U, as shown in Fig. 50. This bar is jointed, as shown in Figs. 1, 4, &c., to the end of a vertically-swinging arm $u$, turning on a horizontal shaft $u'$ and having a sector-pinion $u^2$, engaged by a vertically-guided rack-bar $u^3$, whereby the arm is caused to swing the lifting-bar U from the position in which it receives the matrices upward to a position at the top of the frame, where it comes to a bearing and remains at rest, while a horizontal sliding pusher $v$ carries the matrices to the right and into engagement with the lower edge of a fixed horizontal distributer-bar V, from which they hang in suspension. It will be observed that the axis of the arm U is located midway between the point at which the matrices are received and the point to which they are elevated. This permits the matrices to be elevated a long distance by a short arm swinging through an arc of one hundred and eighty degrees, more or less. This short arm is more easily and speedily operated than a long one and can be used in a machine which has a much less width from front to rear than those now in the market. The pusher $v$ is urged to the right by an actuating-lever $v'$, acted upon by a spring $v^2$. That portion of the distributer-bar V lying to the left of the magazine has its lips or ribs uninterrupted and of such form that all of the matrices are retained on the bar until they reach positions over the magazine, where the flange of the bar is reduced in width step by step, as clearly shown in Figs. 9 and 21, so that the different matrices, varying as to the width between their upper lips, will be permitted to fall from the bar at different points in its length in order to pass into different portions of the magazine. This distributer-bar is a means for dividing the entire series of matrices into groups and delivering these groups to the secondary distributer, by which the matrices are separated and directed to their appropriate magazine-rails.

I commonly divide the entire series of matrices into ten groups, each group containing matrices representing twelve characters. In other words, the machine, as shown, will have one hundred and twenty characters represented in the keyboard and magazine, and the distributer will first divide these matrices according to the groups to which they belong, delivering those of each group to the secondary distributer at a given point, after which the secondary distributer will subdivide the groups and determine the course of the individual matrices, as before mentioned.

It is to be observed that under my organization the matrices are divided into groups by the primary straight-line distributer and that the secondary distributers receiving these groups diverge from the main distributer, each matrix traveling first along the primary distributer in one path and then along the secondary distributer in a path at right angles to that in which it started. This arrangment permits me to use a primary distributer which is much shorter than would otherwise be possible, since it has but few separations to effect. Consequently I am enabled to reduce the width of the distributer and magazine and bring them within a compass not hitherto possible in machines of this class. This is of importance not only in that it renders the machines compact, but in that it reduces the distance which the matrices have to travel laterally in order to reach the assembling-point. In composing mechanisms one of the greatest difficulties is that of preventing transpositions of the characters released in rapid succession and having to travel materially different distances to the assembling-point. Reduction in the width of the magazine reduces the danger of transpositions and increases the possible speed of composition. Hence the importance of using in connection with a primary distributer for separating the matrices into groups a secondary distributer diverging therefrom for effecting the final separation of the matrices.

In order to effect the movement of the matrices along the primary distributer-bar V and to keep them separated from each other, so that one may not cling to another and carry it to an improper position, I make use of two horizontal feed-screws W, mounted in bearings in the frame and lying along the lower edges of the distributer-bar in position to engage opposite edges of the matrices hanging on the bar.

In order to effect the separation of the matrices, I construct the receiving ends of the screws as shown in Figs. 22 to 27. The pitch of the threads is about a quarter of an inch until the forward or receiving end is approached, and here the distance between the threads is gradually decreased to about .02 of an inch, the thread being also gradually diminished in diameter, or, in other words, reduced in height as well as in width until it vanishes at the body of the screw, as clearly shown at $w$, Figs. 24, 25, 27, and 28. The matrices have their ears beveled or inclined on the forward sides, as shown in the several figures, in order that they may be the more readily grasped by the threads. As the matrix-line is pushed forward toward the screws the foremost matrix rests against the flat side of the full thread, and as the screws continue their revolution toward each other the small thin edge of their threads enters between the foremost matrix and the next one at opposite edges. As the screws are turned in unison the wider portion of the threads gradually enters behind the foremost matrix, crowding it away from its pinions and carrying it forward along the bar until engaged by the full threads. At each revolution of the screws a matrix is thus engaged and separated from its companions, the result being that the series of matrices is carried along the distributer-bar one after another and separated a distance equal to the pitch of the threads.

It will be observed that the formation of the threads so that they enter between and effect the separation of the matrices avoids the necessity for the lifting or other feeding devices which have heretofore been used in this class of distributers for the purpose of separating the matrices and introducing them singly between the threads of the screws.

The essence of my invention resides in the gradual reduction of the screw-threads toward the receiving end, so that they will engage and separate the matrices delivered toward the end of the screws, and it will be manifest to the skilled mechanic that the shape and size of the threads at the receiving end may be modified without departing from this mode of action or passing beyond the scope of my invention.

Although their use is unnecessary, if the threads are properly constructed and the machine intelligently handled, I prefer to employ at the forward ends of the screws two guards or safety devices, such as shown in Figs. 22 to 25, consisting of two plates $w^3$, located adjacent to the receiving ends of the screws and arranged to vibrate transversely of the screws on pivots $w^4$ at their upper ends. These plates are urged toward each other by a connecting-spring $w^5$, and are separated at each revolution of the screws by cams $w^6$, formed on the screws and acting within the plates, as shown, the arrangement being such that at each revolution of the screws the plates are spread apart, as shown in Fig. 25, centrally to permit the advance of a matrix between them toward the screws and thereafter permitted to close together, so as to arrest the advance of the matrix-line for the time being. The cams are so timed that when the full portion of the thread is in front of the forward matrix the guards are out of the way; but when the reduced portion of the thread is in front of the matrix the guards prevent the line from following until the broad portion of the thread comes in contact with the matrix, when the same separate the guards, permitting the first matrix to pass forward. In practice it has been found that if the guards are not used the foremost matrix will sometimes reach the reduced ends of the screws at such time and in such manner that one screw will engage before the other, thus carrying one edge of the matrix in advance of the other, in which case the matrix is liable to bite upon the distributer-bar and become bent by the action of the threads. When the guards are used, the first matrix will always strike either the broad flat portion of the thread or the guards.

The mechanism above described serves, it will be remembered, to carry the matrices along the primary distributer-bar, by which they are divided into groups and all those of each group permitted to fall at one and the same place into the secondary distributer below. The construction of this secondary distributer D, which delivers the matrices to the magazine-rails C, is clearly shown in Figs. 1, 2, 3, 5, 6, 10, 11, 13, 14, 15, and 16, and consists of a series of inclined plates $d$, fixed in position edge to edge against the upper ends of the magazine-rails C and in such position that the matrices falling from the distributer-bar above will slide downward over them. Each of these bars $d$ represents one group of matrices, and all the matrices belonging to one group slide downward over one and the same bar. Each bar is provided with a series of openings $d'$, through which the matrices pass from the upper side and by which the matrices are supported and guided, as shown in Fig. 6, so that as they emerge from the openings on the back they are received upon and sustained by the magazine-rails C engaging their upper ends. In each plate $d$ each hole differs in form at its upper and lower ends from any other hole in the same plate, and this for the purpose of distinguishing between the different matrices in the one group and permitting each matrix to pass to its appropriate magazine-rail and no other.

The distributer-plates $d$ are constructed in duplicate—that is to say, they are alike in every respect, the openings in one plate being duplicates of those in another. This fact admits of the entire series of plates being constructed by one set of tools. Owing to this fact it is possible to construct the magazine very cheaply and by the addition of plates to build the magazine to any width which may be required in order to adapt the machine to carry a large assortment of matrices. Over the adjoining edges of the plates $d$ are secured upright bars or strips $d^4$, which serve as guides to prevent lateral movement of the matrices and guide them downward in exact register with the openings, so that each matrix will be certain to pass through the proper opening when it is reached.

The matrices Z to be used in my machine are constructed as shown in detail in Figs. 17 to 20, &c. Each matrix consists of a flat plate of generally rectangular form having in one vertical edge the intaglio character or matrix $z$. Both vertical edges are recessed in order to form the horizontal shoulders $z'$, utilized in supporting and alining the matrices, as hereinbefore referred to. Each matrix is recessed at the upper end and formed with two inwardly-projecting oppositely-arranged lips $z^3$, which are utilized in connection with the primary distributer-bar V to divide the matrices into groups. Assuming that the machine contains an assortment of one hundred and twenty characters and that they are divided into ten groups of twelve matrices each, all the matrices in any one of these groups will have their lips $z^3$ separated to the same extent, and this although different matrices in the same group will carry different characters. It follows that as the matrices are moved along the distributer-bar V the lips $z^3$ will permit all the matrices of one group to escape at one point and to slide downward over one and the same plate $d$ of the secondary distributer. The four matrices shown in Figs. 17 to 20 belong to one group. Each matrix is provided in the upper and the lower ends with notches $z^4$, alike in form. The different matrices in each group differ as to the form or size of these notches—that is to say, a matrix carrying "a" will have its notches $z^4$ of different form from a matrix carrying "b," although the two matrices may belong to one and the same group. It is this variation in the form of the notches $z^4$ which enables the distributer-plates $d$ to determine the point of delivery of the various matrices. The plates are constructed, as shown in Figs. 14, 15, &c., with projections $d^5$, extending into their openings, and of forms corresponding to the notches in the respective matrices, so that as each matrix slides downward over the plate $d$ it is sustained at the sides or ends, or both, until it reaches an opening of corresponding form, when for the first time it is permitted to fall through the plate. The essence of my invention in this regard resides in the use of a distributer-plate with a row of openings of varying forms in connection with the correspondingly-shaped matrices, so that each matrix will be supported in passing from the upper distributer over the intermediate openings until it arrives at the opening of the appropriate magazine. While I prefer to build up this distributer-plate in a series of strips of like form and to make the matrices and the openings in the form shown, it will be manifest to the skilled mechanic that a wide variation in arrangement is possible without changing the principle of operation or departing from the limits of my invention.

In order that the matrices may pass down with rapidity over the secondary distributer, I arrange it commonly at an angle of from twenty to thirty degrees from the vertical, and in order to prevent the rapidly-moving matrices from being carried over or past the proper openings I propose to use pressure devices of any suitable character above the distributer, so that the matrices passing thereunder will be urged toward the plates $d$ and caused to pass through the openings with certainty. These pressure devices may be made in various forms; but I recommend, as shown in the drawings, a series of gravitating rollers X, lying one opposite each of the distributer-openings $d'$. These rolls, of rubber, metal, or other appropriate material, are mounted, as shown in Fig. 13, on horizontal shafts $x$, mounted in a skeleton frame $x'$, hinged at its upper end to the main frame, as shown in Figs. 1 and 2, so that it may be swung upward in order to lift the entire series of rolls away from the distributer-plate, as indicated by dotted lines in Fig. 2, and thus expose the entire upper surface of the distributer. The rolls are preferably driven so that their lower surfaces will tend to urge the matrices downward. To this end the shafts are provided inside of the frame with a series of pinions $x^6$, engaging one another, so that when one shaft is revolved the others will be turned. By making the alternate gear-wheels on each side loose upon the shafts and the others tight thereon all the shafts may be revolved in the same direction. Motion is imparted to the train of pinions, as shown in Fig. 13, &c., by two driving-pinions $x^7$, mounted in shafts in the main frame and driven by belts $x^8$ on pulleys $x^9$ on the shaft which carries pulleys for the vertical belts H, hereinbefore referred to.

In order to permit convenient access to all the magazine-rails, the matrices thereon, and the escapements, I propose to mount the guide-chutes G and the shafts which carry the pulleys for belts H on a frame hinged to swing backward away from the other parts. I prefer to employ the shaft of the upper roll $h$, mounted in the main frame, as an axis on which to swing the frame, as above referred to, a latch or fastening device of any kind being employed to hold the frame in position.

Referring now to details of the driving mechanism, the pusher or line-transferring device T is mounted, as shown in Fig. 36, on a horizontal slide connected by link $t$ to an upright lever $t'$, which is pivoted at its lower end and urged in one direction by a spring $t^2$ and in the opposite direction by a cam $t^3$ on the main shaft.

The operation of the machine as a whole is as follows: A suitable assortment of matrices being suspended from the magazine-rails C and the pot being filled with metal in a molten condition, the operator manipulates the finger-keys representing the various characters and spacers in the order in which they are to appear in print. The finger-keys, actuating the escapements E, cause the discharge of matrices Z one at a time from the escapement-rails C. The matrices, falling from the rails into the chutes or conductors G upon the belts H, are carried downward thereon and delivered with a quarter-turn through the mouth-pieces at the bottom to the transverse inclined belt I, by which the matrices are delivered one after another into the assembler J, which also receives the spacers falling into it from the magazine L above it. When the composition of the line is completed, the line is transferred by the operator from the assembler J into the support or carrier M. This carrier then swings forward, presenting the matrices against the mold, and the carrier proper is given a slight elevation to aline the matrices vertically against the mold. The wedge spacers are thrust upward through the line by the underlying bar $y^4$ and the line justified or elongated to the limit permitted by the abutments $n$ at the face of the mold. As the matrix-line is carried against the mold the latter is carried against the mouth of the melting-pot S, the parts being closed tightly together, so that the mold is in intimate contact with the pot at the rear and with the matrices at the front. The pump-plunger $s$ is actuated to deliver molten metal into the mold and against the matrices, thereby producing a slug or linotype having on its edge raised type characters formed in the matrices. The matrix-support swings forward, withdrawing the matrices from the mold, and the mold swings forward from the pot, thus separating the slug from the sprues or the metal in the mouth of the pot. The mold slides to the left, presenting the slug in front of the ejector-blade Q, which, advancing from the rear, pushes the slug out of the mold and upon the receiver or galley at the front. While these operations are taking place and while the marix-line support M stands in alinement with the stationary guide or channel O the carrier or pusher T advances to the left and transfers the matrices from the support into the guide O, at the same time causing their engagement with the elevator-bar U, which then ascends, lifting the matrices to the top of the machine into the path of the pusher $v$, by which they are advanced along and in engagement with the lower edge of the distributer-bar V to the end of the feed-screws, where they are separated in a line one after another and carried along the primary distributer-bar V until released and permitted to fall therefrom at different points, according to the groups to which they belong, and through the twisted guides below to the secondary distributer, down which they pass under the pressure-rolls until they reach the appropriate openings, through which they pass into engagement with the magazine-rail C, where they are held until delivered one at a time by the escapements.

Motion is communicated to the various operative parts of the machine in the manner following: In order to permit the operations of composing one line of matrices, casting from another, and of distributing a third to proceed concurrently, it is necessary that the composing and distributing mechanisms shall run continuously, while the mechanism for handling the composed lines, casting the slugs therefrom, and delivering the slugs into the galley operate intermittingly. All of the principal cams for imparting motion to the various parts of the casting and ejecting mechanisms, &c., are mounted on the main shaft B, so that one revolution of the shaft completes the cycle of operations incident to the formation and delivery of a slug. This main shaft B is rotated intermittingly through a gear-wheel B', secured thereto and receiving motion, as shown in Figs. 29, 31, 52, and 53, from a pinion $B^2$ on a horizontal shaft $B^3$, seated in the main frame and driven through a friction-clutch $B^4$ from the band-pulley $B^5$, seated around its outer end and continuously driven. The clutch consists of a spindle mounted to move longitudinally within the shaft $B^3$ and having at its outer end a collar jointed to radial arms carrying friction-shoes, which act against the inside of the rim of the pulley, so that when the central spindle is drawn inward the shoes will engage the driving-pulley and lock the same to the shaft, so that motion will be communicated from the pulley $B^5$, through the intermediate parts, to the gear B' and the main shaft B, with its cams. A spiral spring encircling the spindle-clutch tends to hold the clutch in engagement; but as the wheel finishes each revolution an arm $B^6$, pivoted to the wheel B' and beveled on one side, rides against the inner end of the clutch-spindle $B^7$, forcing the same outward, and thereby disengaging the clutch and stopping the action of the main shaft. The arm $B^6$ has a limited motion independent of the wheel in the direction of its rotation on the connecting-pivot, so that when it stands in position to hold the clutch out of action, as shown in Figs. 52 and 53, it may be turned downward below the end of the spindle $B^7$, thereby permitting the clutch to engage and causing the machine to start. The downward action of this arm or lever $B^6$ is effected at the will of the attendant by the starting-lever $B^8$, pivoted to the frame and connected by link $B^9$ with crank-arm on shaft $B^{10}$ at the base of the machine, this shaft having also a second crank $B^{11}$, connected by link $B^{12}$, elbow-lever $B^{13}$, sliding latch $B^{14}$, and link $B^{15}$ to a handle $B^{16}$. The movement of the handle $B^{16}$, through the intermediate parts, throws down the dog or lever $B^6$, allowing the clutch to operate.

For the purpose of communicating motion to the assembling devices a belt is extended from the main pulley $B^5$ to a lower pulley $B^{17}$ on a horizontal shaft $B^{18}$ in the base of the machine. This shaft carries a second pulley $B^{19}$, from which a belt $B^{20}$ (see Fig. 4, &c.,) extends to a pulley $B^{21}$ on the horizontal shaft $B^{22}$, carrying the pulleys on the vertical belt H, hereinbefore described. From another pulley on this shaft belt $B^{23}$ is extended upward to a pulley on horizontal shaft $B^{24}$, carrying the pulleys for the upper ends of belt H. This shaft $B^{24}$ also carries a grooved pulley, from which belt $B^{25}$ is extended to a grooved pulley on one of the distributer-screws W, which latter is connected with its companions by pinions, as shown. The shaft $B^{22}$ is also provided with pulleys connected by the belt $B^{26}$ with pulleys on the horizontal shaft $B^{27}$, (see Fig. 2,) carrying a pinion engaging a pinion on one of the roll-shafts $x$ of the second distributer, as shown in Fig. 13. On the other side of the machine the shaft $B^{22}$ is connected through a pulley and belt $B^{28}$ with a pulley on shaft $B^{29}$, carrying, as shown in Fig. 13, the pinion $x^7$ to engage a pinion $x^6$ on one of the distributer roll-shafts $x$.

It will be perceived that the assembling devices and the carrier-screws of the distributer are kept constantly in motion, so that the operations of composing or assembling the matrix-line and the operation of distributing the matrices after they have been used will be carried on continuously and without reference to the casting and transferring devices, which have an intermitting action.

The functions of the cams on the main shaft are as follows: Cam 1, the right-hand cam looking from the front of the machine, reciprocates the mold right and left from the casting position to the ejecting position, and vice versa, through the lever $p^3$, rack $p'$, pinion $p$, and rack P, attached to mold, as more fully shown in Fig. 48. Cam 2 causes the transfer of the line of matrices and spaces after the casting onto the elevator. This is effected through the arm $b^7$, pivoted at its lower end and having at its top a roller bearing on the edge of cam 2. This arm engages a horizontal arm on a vertical shaft, which carries the arm $b^8$, attached to the pusher-slide, as fully shown in Figs. 35 and 38. Cam 3 effects the justification, as shown in Fig. 42, its periphery being provided with steps $y^9$, as heretofore explained. Cam 4 rocks the matrix-carrier carrying the line of matrices and spaces against the mold for casting and away from the same, so that the line can be transferred onto the elevator for distribution, and again into the normal position for receiving the line from the assembler. A special cam-surface on the side of cam 4 operates through arm $l''$, shaft $l^8$, arms $l^7$ and $l^6$, and the driver $l^4$, which transfers the space-bands remaining after the elevator has carried up the line of matrices. Cam 5 controls the pump delivering the metal from the pot, as shown in Fig. 38, the cam acting, as heretofore explained, on lever $s^6$, connected with the pump-lever. Cam 6 operates the matrix-elevator U in the manner shown in Figs. 2, 4, and 36. It will be remembered that the shaft, with its carrier-arm, is provided, as shown in Fig. 2, with sector-pinion $u^2$, operated by the vertical rack-bar. This bar is connected by a downwardly-extending link $u^6$ to lever $u^7$, on which the cam acts to effect its depression, and thereby the downward-swinging movement of the elevator. The return movement of the levers is effected by a spring $u^8$, connected to the elevator $u^7$ and raising the same, as shown in Fig. 2. Cam 7 is, in fact, the main driving-gear, provided on one side with a cam-surface to actuate the slug-ejector and on the opposite side with a cam-surface to operate the slide for advancing the elevated matrices to the distributer.

The mode of operating the ejector is plainly shown in Fig. 47, the ejector-blade being connected to a guided rod $q$, which is in turn connected by a link to the lever $q'$, pivoted at its lower end to the frame. The connecting-bar $q^2$ extends from this lever to a second upright lever $q^3$, pivoted to the main frame and carrying on its side a stud which enters the cam-groove. This groove is so formed as to advance and retract the ejector at the required times, but to hold it normally at rest in its rearmost position. The manner in which cam 6 transmits motion to the matrix-shifter is shown in Figs. 1 and 4, in which it will be seen at the lower end of the slide operating the lever $v'$, which carries a stud to act against the cam.

The cycle of operations caused by one revolution of the main cam-shaft is as follows: After the line of matrices and spaces has been transferred by the hand-lever $B^{16}$, Fig. 29, acting through the arm $k$, the reverse movement of the arm $k$, acting through latch $B^{14}$, trips the dog $B^{13}$, bringing the clutch into action. Cam 1 transfers the mold from the ejecting position to a position directly in front of the mouthpiece of the pot. Simultaneously cam 4 carries the line of matrices and space-bands forward against the mold and forces the mold against the pot-mouth and matrices against the mold, thus locking the parts together in suitable position for casting, as shown in Fig. 38. Cam 3 effects the justification of the line by raising the spaces after the line is in position between the abutments at the ends of the mold, as shown in Fig. 35. Cam 5 then operates the pump. Cam 4 then withdraws the line of matrices and spacers into position, as shown in Fig. 36, in line with the elevator. Cam 2 then operates through the lever $t'$ and transfers the line of matrices to the elevator U, Fig. 36. Simultaneously with this action cam C, through the rack and through intermediate parts, moves the mold from the casting position to the ejecting position, as shown in Fig. 35. Cam 6 then effects the raising of the elevator U, thereby raising the line of matrices to the level of the distributer, while the space-bands are left behind, as shown in Figs. 1 and 50. The side of cam 7 then operates the lever $v'$, advancing the matrices to the distributer-screws, by which they are carried along the distributer-bar and their delivery to the secondary distributer effected. The side of cam 4, operating lever $l^7$, returns the space-bands to their reservoir or magazine, as shown in Figs. 33 and 34. Cam 7 operates the ejector when the mold is directly before it. After the matrix-line has been transferred to the elevator U cam 4 returns the matrix-carrier M into position to receive the next line.

While I prefer to make use of the primary distributer-rail in the form shown, it is to be understood that I may use a rail of any equivalent form—for example, such as that used in the commercial linotype-machine of the present day or any other known or suitable form of mechanism which will separate the matrices into groups and deliver the matrices of the different groups to the secondary distributer at the required points. It is also to be understood that instead of using the feed-screws for the primary distributer in the form shown I may substitute any other means which will cause the matrices to travel along the bar—such, for example, as the screws and lifting devices for presenting the matrices thereto as used in commercial linotype-machines at the present time.

While it is preferred to employ matrices in the form shown, it is manifest that they may be modified at the pleasure of the mechanic, provided they retain the distinguishing features common to all matrices in one group for effecting primary distribution and other distinguishing features differing as to the matrices in each group for effecting the secondary or final distribution.

It will of course be understood that the machine shown and described herein contains various devices and subordinate mechanisms which may be used in combinations other than those herein shown. For example, the distributer may be used with a different magazine or the magazine employed with a different distributer and both the magazine and distributer may be used in connection with assembling and with casting devices of various forms already known in the art.

Having described my invention, what I claim is—

1. A matrix for a linotype-machine, having in one end suspending-shoulders and also having in opposite ends central complementary notches or openings to coöperate with the distributing devices.

2. A matrix for a linotype-machine, consisting of a flat plate having its vertical edge recessed and provided with the matrix proper, its upper end provided with inwardly-projecting lips or shoulders, and its upper and lower ends provided with recesses to coöperate with distributing devices.

3. A font of matrices for a linotype-machine, each provided with inwardly-extending lips at the upper end and with notches or recesses at the upper and lower ends, said font comprising a series of groups, those of one group differing from those of another group as to the distance between the lips, and those of each group differing from others of the same group bearing different characters as to the form of the end notches.

4. A font of matrices for a linotype-machine, consisting of a series of groups, those of each group having suspending-lips differing from those of the other groups, and those of each one of the groups differing from each other as to notches coöperating with the distributer, whereby the font may be first separated into groups and the matrices in each group separated according to the characters borne by them.

5. A matrix for a linotype-machine, provided with suspending lips or shoulders at its upper end and having its two opposite edges beveled for engagement with feed devices, substantially as described.

6. In a linotype-machine, a primary distributer by which the matrices are divided into groups, each including several characters, and the groups delivered at different points, in combination with a series of secondary distributers diverging from the main distributer and arranged to separate the matrices of the respective groups and deliver them individually at different points according to the characters borne by them, whereby the distribution of a large number of characters is rendered possible by mechanism of limited width.

7. In a linotype-machine, the combination of a straight line-distributer, adapted to receive all the matrices and separate them into groups, and a series of secondary downwardly-inclined distributers at right angles to the first distributer to which the matrices are delivered by the first distributer, said secondary distributers adapted to separate the matrices and deliver them individually at different points.

8. In a linotype-machine, a distributer-rail, longitudinally-toothed and adapted to separate the matrices into groups, in combination with a series of secondary parallel distributers, arranged in angular relation to the distributer-rail to receive the respective groups and each having a series of openings adapted to separate the matrices bearing different characters from each other.

9. In a linotype-machine, the combination of a longitudinally-toothed distributer-bar and means for advancing the matrices in suspension along said bar to the points of release, and a series of secondary inclined distributers over which the matrices descend by gravity, said secondary distributers provided with openings of varying form to separate matrices bearing different characters.

10. In a distributing mechanism, a feed mechanism for matrices, comprising two screws having their threads reduced at one end, in combination with means for presenting a line of matrices endwise toward the screws in position to be engaged by the reduced threads, whereby the screws are adapted to separate the matrices one at a time from the line and feed them forward out of contact with each other.

11. In a linotype-machine, the combination of a distributer-rail, feed-screws lying parallel with the rail and having the threads at their receiving ends reduced, substantially as described, and means for presenting a line of matrices toward the screws in the direction of their axes, whereby the screws are adapted to separate the matrices and feed them along the distributer-bar.

12. In a linotype-machine, the combination of a distributer-bar, means for separating a line of matrices adjacent to the end of said bar and at suitable height to engage the same, means for urging said matrices toward the bar, and feed-screws having their threads reduced at the receiving end to engage the matrices, separate them and advance them along the bar.

13. In a linotype-machine, in combination with a distributer, means for advancing a line of matrices toward the same, feed-screws having their threads reduced toward the receiving end, and intermittingly-acting stops to arrest the advance of the matrices toward the screws, whereby the screws are prevented from engaging a second matrix until the preceding one is advanced away from the line.

14. In a linotype-machine, in combination with a distributer, the feed-screws having the threads reduced at the receiving end, and matrices having their edges beveled to facilitate the engagement of the screws.

15. In a linotype-machine, the distributer-bar, the feed-screws having reduced threads, the vibrating stops to detain the advancing matrices, and eccentrics on the screws to actuate said stops.

16. In combination with the distributer, the feed-screws and the vibrating stops, eccentrics to move the stops in one direction, and a spring or springs to move them in the opposite direction.

17. In a linotype-machine, a longitudinally-toothed distributer-bar, along which the matrices are advanced to different points of release, in combination with secondary distributers, and an intermediate guide adapted to receive the matrices from the first distributer and give them a quarter-turn before delivery to the secondary distributer.

18. In a linotype-machine, the combination of two distributers adapted to carry the matrices in planes at right angles to each other, and intermediate means to receive the matrices from the first distributer, give them a quarter-turn and deliver them to the secondary distributer.

19. In a linotype-machine, a distributer consisting of an inclined plate, over which the matrices may descend by gravity, said plate provided at different points in its length with openings equal in their extreme dimensions, but differing in form and adapted to sustain each matrix until it arrives at the appropriate opening.

20. In a linotype-machine, an inclined distributer-plate provided with a succession of openings differing in form, in combination with means for delivering the matrices over said plate, and means for urging the matrices through the corresponding openings when they are reached.

21. In a linotype or kindred machine, an inclined distributer-plate provided with a row of variant openings, over which the matrices descend by gravity, in combination with a series of pressure-rolls overlying said openings.

22. In a linotype-machine, an inclined distributer-plate provided with a row of variant openings, in combination with pressure devices overlying said openings, and means for imparting a rotary motion to said pressure devices.

23. In a linotype-machine, a distributer-plate provided with a row of variant openings, one below another, in combination with overlying pressure devices and means for moving the pressure devices in a downward direction adjacent to the openings, whereby the passage of the matrices from one opening to another is facilitated.

24. In combination with the magazine having a series of openings therethrough for the passage of the matrices, the series of overlying yielding rollers and means for imparting rotary motion thereto.

25. In a linotype-machine, the combination of a distributer-plate having a series of variant openings for the passage of matrices therethrough, and the adjacent magazine-rails adapted to engage and sustain the matrices.

26. In a linotype-machine, an inclined distributer-plate with variant openings for the passage of the matrices therethrough, in combination with inclined supports below said magazine to receive and sustain the matrices, and escapement devices for delivering the matrices, one at a time, from the respective supports.

27. In combination with a distributer-plate having variant openings for the passage of the matrices therethrough, the inclined magazine-rails adapted to engage the upper ends of the matrices, and escapement devices sustained by the lower ends of the magazine-rails.

28. In a linotype-machine, the distributer consisting of a series of duplicate plates, each provided with a series of variant openings.

29. In a linotype-machine, a distributer containing a series of rows of openings, those of one row being the same as those of another, but the several openings in each row differing in form.

30. In a linotype-machine, the distributer consisting of a series of plates, each provided with variant openings, and the overlying strips or bars to guide the matrices in their passage over said plates.

31. In combination with a magazine having a series of openings therein, an adjacent frame provided with pressure devices and mounted to be swung away from the distributer at will, whereby access to the entire distributer is afforded.

32. A magazine for a linotype-machine, consisting of a series of parallel inclined rails, fixed in position, their upper ends exposed to receive the matrices and their lower ends sustaining escapement devices to deliver the matrices one at a time.

33. In a linotype-machine, a series of inclined magazine-rails arranged in a vertical tier, one over another, means for releasing the matrices therefrom, that they may fall by gravity, and an underlying inclined conductor arranged to receive the falling matrices, sustain them on their sides and guide them to a given point.

34. In a linotype-machine, the series of magazine-rails arranged one above another in a series of vertical rows, in combination with means for discharging the matrices, one at a time, from the lower ends of said rails, and conductors underlying the rails to receive the matrices and guide them downward, and a transverse conductor whereby the matrices falling from the first-named conductors are carried laterally to a common assembling-point.

35. In combination with the magazine-rails, fixed in position, the series of underlying conductors, hinged to be swung away from the magazine at will, whereby access may be had to the entire magazine and the escapements.

36. In a linotype-machine, the combination of an inclined distributer-plate provided with a series of openings, a transverse supporting-bar thereunder, a magazine-rail attached to said bar with its upper end in position to receive and sustain the matrices passing through the distributer-openings, and means for retaining the matrices on the bar and delivering them therefrom at will.

37. In combination with an inclined magazine-rail adapted to hold matrices in suspension, matrices having horizontal upper ends, and a horizontal rock-shaft having a longitudinal groove or shoulder to receive the upper end of the foremost matrix and hold the same from turning as it is delivered from the rail.

38. In combination with a magazine-rail to hold matrices in suspension, the horizontal grooved rock-shaft to deliver the matrices and hold them from turning on the rail, its pinion, the sector-wheel to operate the pinion, and finger-key connections to said sector.

39. In combination with the inclined magazine-rail, the horizontal rocking escapement, its pinion, the sector-pinion, the spring tending to move the sector in one direction, and the finger-key and connection therefrom to move the sector in the opposite direction.

40. The inclined magazine-rail, sustained on its upper side, in combination with the rocking escapement, its operating-sector, and the support for the last-named parts, attached to and sustained by the magazine-rail.

41. In a linotype-machine, the combination of a magazine arranged to hold the matrices in planes at right angles to those in which they are used, an assembling mechanism, and intermediate devices for giving the matrices a quarter-turn between the magazine and the assembler, whereby the matrices are presented in proper position for assemblage and use.

42. In a linotype-machine, an upper distributer, means for giving the matrices a quarter-turn after leaving said distributer, a secondary distributer, a secondary magazine to receive the matrices after they have been turned, and means for giving the matrices another quarter-turn after leaving the magazine, whereby they are faced in the proper direction for use.

43. The combination of a series of magazine-rails, adapted to hold the matrices in suspension, escapement devices for releasing said matrices, guides directing the matrices downward in parallel lines, the series of twisted tubes $g$ arranged to receive the matrices, and the underlying carrier-belt arranged to receive the matrices from said tubes.

44. In a linotype-machine, in combination with the assembler to receive the matrices, the adjacent yielding rolls, and the carrier-belt to deliver the matrices to the rolls.

45. In combination with the assembler to receive and sustain the matrices, the grooved roller at its receiving end, and the transfer mechanism provided with a finger seated in the grooved roll for the purpose of advancing the line of matrices.

46. In combination with the melting-pot and the mold, the matrix-line support sustained by and movable vertically on a reciprocating carrier, substantially as described, whereby the matrices may be moved to and from the mold and moved vertically to effect the alinement against the mold.

47. In combination with a coöperating mold, a forwardly and backwardly moving frame $m^4$, a line-holder M, movable vertically on said frame, and means for effecting the vertical movement of the holder and the to-and-fro motion of the frame.

48. In a linotype-machine, the combination of the mold and projections or shoulders at its end to limit the elongation of the matrix-line, a matrix-line carrier or support movable to and from the mold, and means for inserting the composed line of matrices endwise into the carrier, whereby the presentation of the matrix-line to and its support in front of the mold are effected.

49. In a linotype-machine, a composed line of matrices and wedge spacers therein, in combination with a mold having forward projections at its ends to limit the elongation of the matrix-line, a line-support movable to and from the mold, and means for advancing the spacers through the line while in front of the mold.

50. In a linotype-machine and in combination with a coöperating mold, a channeled line-carrier movable to and from the mold, a stationary assembler or line-support J, wherein the line of matrices is primarily sustained, and means for transferring the line of matrices from the assembler to the movable support when the two are in alinement.

51. In a linotype-machine and in combination with a coöperating mold, a stationary assembler or support J for the composed line of matrices, a line-support M, movable transversely past said assembler, a stationary receiving-channel O, out of line with the assembler, and means for transferring the composed line, first from the assembler into the support, and thereafter from the support into the receiving-channel.

52. In a linotype-machine and in combination with an elevator for the matrix-line, a mold, a relatively movable line-carrier M for presenting the matrices to the mold, a receiving-channel O in position to guide the matrices into engagement with the elevator, and means for transferring the matrices from the support M into the receiving-channel and into engagement with the elevator.

53. In a linotype-machine, the combination of the fixed support or assembler J for the matrix-line, the melting-pot, the longitudinally-reciprocating mold, the matrix-support M, movable to and from the mold, the vertically-movable elevator U, the fixed guide O, means for transferring the line of matrices from the assembler J into the holder M, and means for thereafter transferring the line from the support M into the channel O and into engagement with the elevator.

54. In combination with the elevator adapted to engage and lift the line of matrices, a supporting-channel O, and a finger *o* to retain the spacers when the matrices are lifted away.

55. In a linotype-machine and in combination with means for temporarily sustaining a composed line of matrices and spacers, an elevator adapted to lift the matrices, and a stationary finger adapted to pass through and retain the spacers.

56. In combination with a fixed support or channel O for the composed line of matrices and spacers, the finger *o* to retain the spacers, the elevator to lift the matrices, and means for delivering the composed line endwise into the channel O, substantially as described.

57. In a linotype-machine, the combination of the elevator U for the matrix-line, a distributer-bar having one end formed and arranged to receive the line of matrices directly from the elevator, and its remaining portion toothed to effect distribution of the matrices, a pusher or carrier to advance the matrices from the elevator along the untoothed portion of the bar, and feed-screws lying adjacent to the bar and having the threads reduced at the receiving ends, that they may separate the matrices singly from the line and feed them along the toothed portion of the bar.

58. In a linotype-machine, the combination of the following elements: the inclined magazine-rails, escapements connected with finger-keys for delivering the matrices singly from the distributer-rails, the series of inclined conductors to guide the matrices downward, a transverse carrier and devices to assemble the matrices in line, a melting-pot, a mold, means for presenting the composed line of matrices and spaces to the mold, an elevator for the matrix-line, means for transferring the matrix thereto, the primary distributer-bar and means for delivering the matrices to and along the same, and the secondary distributer arranged to deliver the matrices to the magazine-rails.

59. In a linotype-machine and in combination with the stationary pot, the mold-carrying slide, its support mounted on a horizontal axis, and means for swinging said support to and from the pot.

60. In a linotype-machine and in combination with a stationary melting-pot, a horizontally-reciprocating mold-carrier, a support for said carrier, mounted to swing forward and backward on a horizontal axis, a mold having holders or projections at its ends to sustain the ends of the matrix-line, and a matrix holder or carrier, mounted to move to and from the mold.

In testimony whereof I hereunto set my hand, this 30th day of June, 1900, in the presence of two attesting witnesses.

JOHN R. ROGERS.

Witnesses:
FREDERIC C. WHEELER,
JOHN F. PAULSEN.